(12) United States Patent
May

(10) Patent No.: US 8,297,905 B2
(45) Date of Patent: Oct. 30, 2012

(54) 180 DEGREE INVERTING MECHANISM

(76) Inventor: Lindy Lawrence May, Strafford, MO (US)

( * ) Notice: Subject to any disclaimer, the term of this patent is extended or adjusted under 35 U.S.C. 154(b) by 297 days.

(21) Appl. No.: 12/589,133

(22) Filed: Oct. 19, 2009

(65) Prior Publication Data

US 2011/0091309 A1    Apr. 21, 2011

(51) Int. Cl.
*B66C 13/00* (2006.01)

(52) U.S. Cl. .......................... 414/649; 414/782

(58) Field of Classification Search ............ 118/322, 118/416; 193/44–45, 48; 198/377.1, 403, 198/416; 414/420, 468, 742, 458, 761, 763, 414/773, 778, 779, 782, 783; 427/425
See application file for complete search history.

(56) References Cited

U.S. PATENT DOCUMENTS

| | | | |
|---|---|---|---|
| 2,806,581 A * | 9/1957 | Rees ........................ | 198/377.1 |
| 5,358,372 A | 10/1994 | Meredith | |
| 5,392,895 A * | 2/1995 | Sorensen .................... | 198/375 |
| 5,393,180 A * | 2/1995 | Van Den Aarsen .......... | 414/409 |
| 6,000,902 A * | 12/1999 | Mueller et al. .............. | 414/758 |
| 6,419,983 B1 * | 7/2002 | Kreuzer ...................... | 427/242 |
| 6,663,336 B2 * | 12/2003 | Fletcher et al. ............. | 414/422 |
| 6,769,857 B2 | 8/2004 | Nyhof | |
| 6,823,791 B1 | 11/2004 | Richardson, Jr. et al. | |
| 6,981,831 B2 | 1/2006 | Lonardi et al. | |
| 6,991,087 B2 * | 1/2006 | Krannich et al. ........... | 198/465.1 |
| 7,083,375 B2 | 8/2006 | Lewis et al. | |
| 7,690,882 B1 | 4/2010 | Sjostedt et al. | |
| 2002/0162504 A1 * | 11/2002 | Kreuzer ...................... | 118/416 |

FOREIGN PATENT DOCUMENTS

EP          464950 A  *  1/1992

* cited by examiner

*Primary Examiner* — Gregory Adams
(74) *Attorney, Agent, or Firm* — Polster, Lieder, Woodruff & Lucchesi, LC

(57) ABSTRACT

A mechanism for inverting containers or other objects. The mechanism inverts the container or object a full 180 degrees while providing motion control without the use of hydraulic actuators; thereby eliminating the costs, maintenance, environmental issues, and contamination concerns associated with hydraulic systems. The primary application for the inverting mechanism is inverting containers for the purpose of emptying the contents. The mechanism may also be employed to rotate a variety of other objects in other applications.

19 Claims, 24 Drawing Sheets

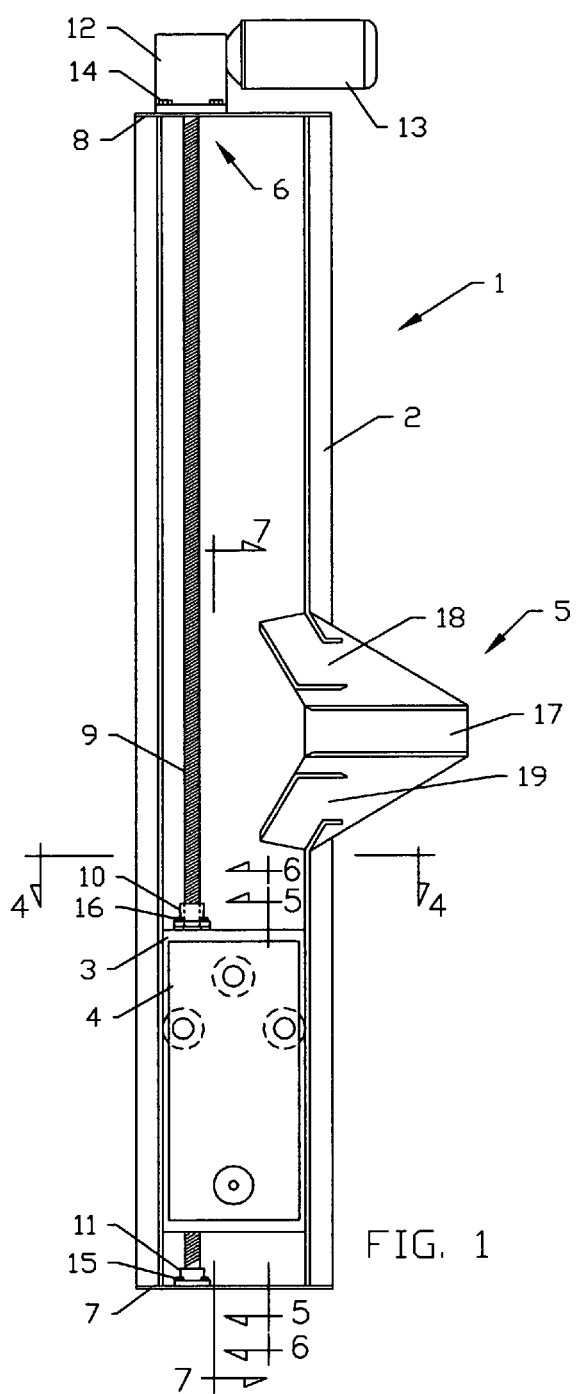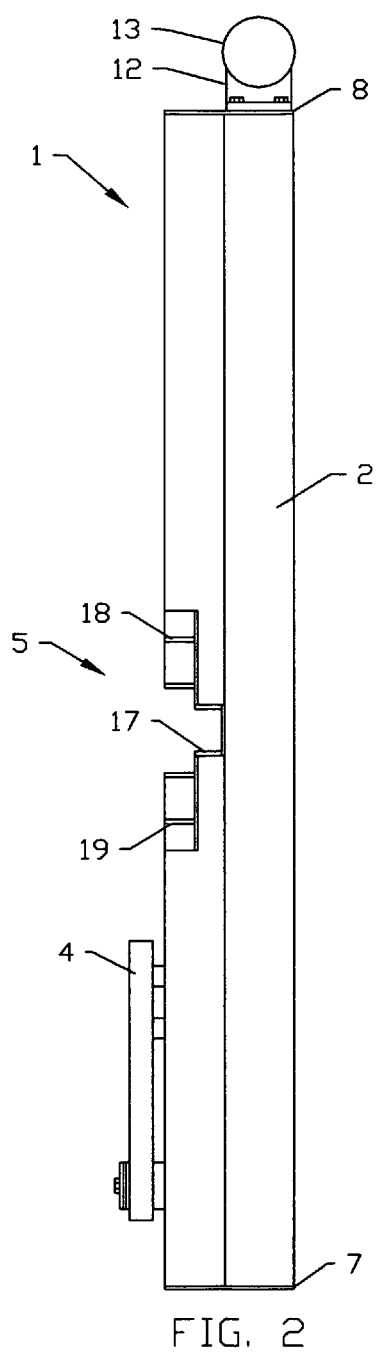
FIG. 1
FIG. 2

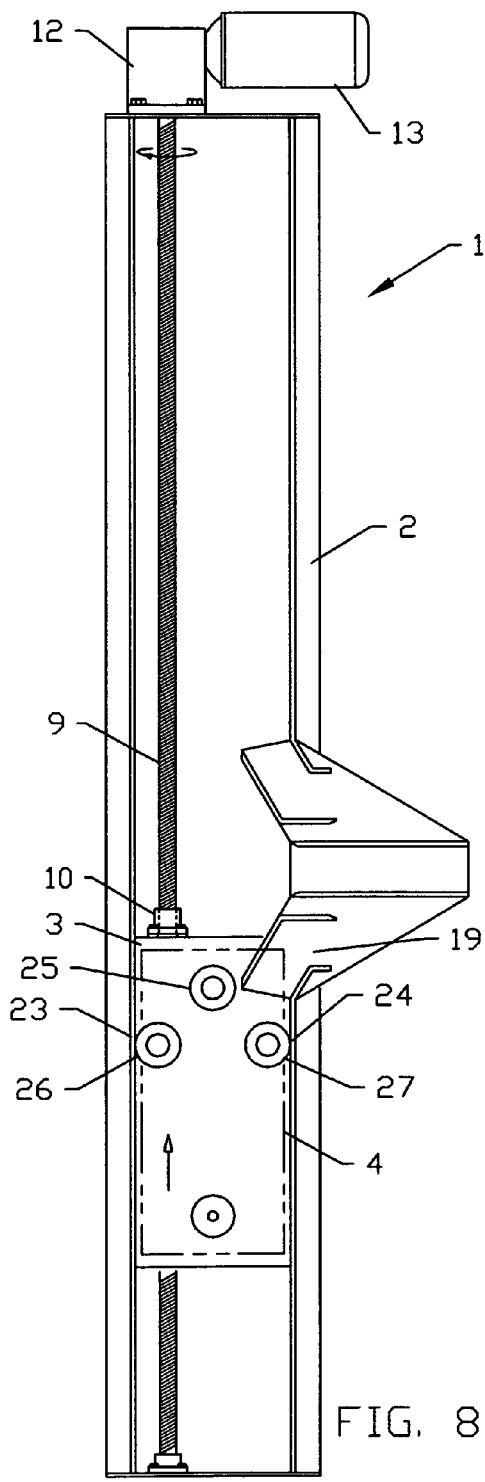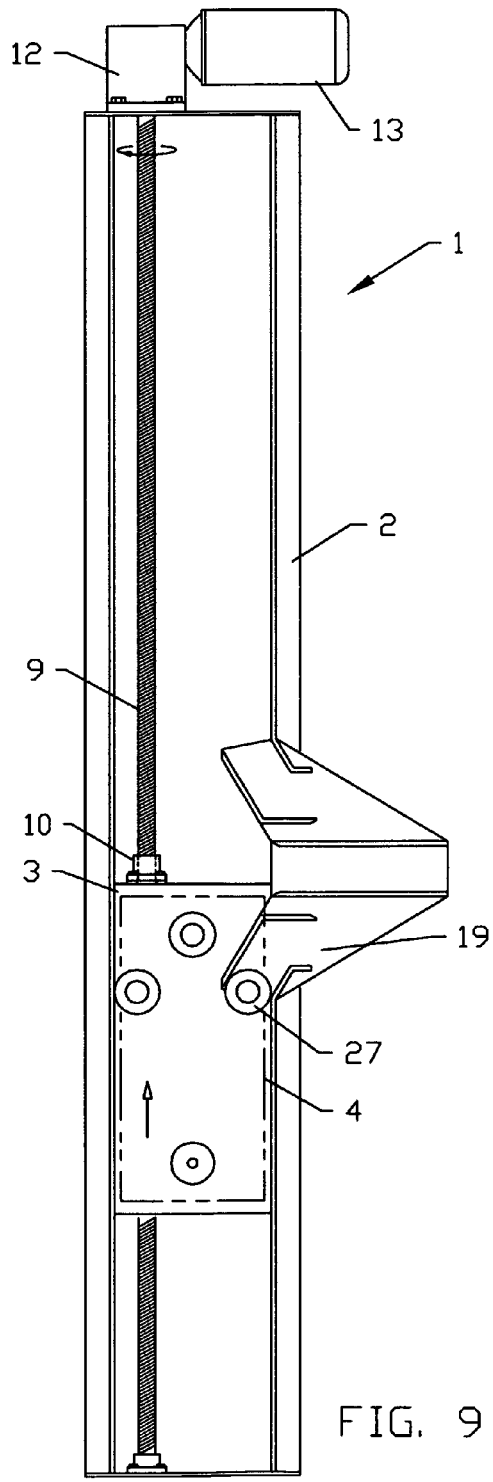

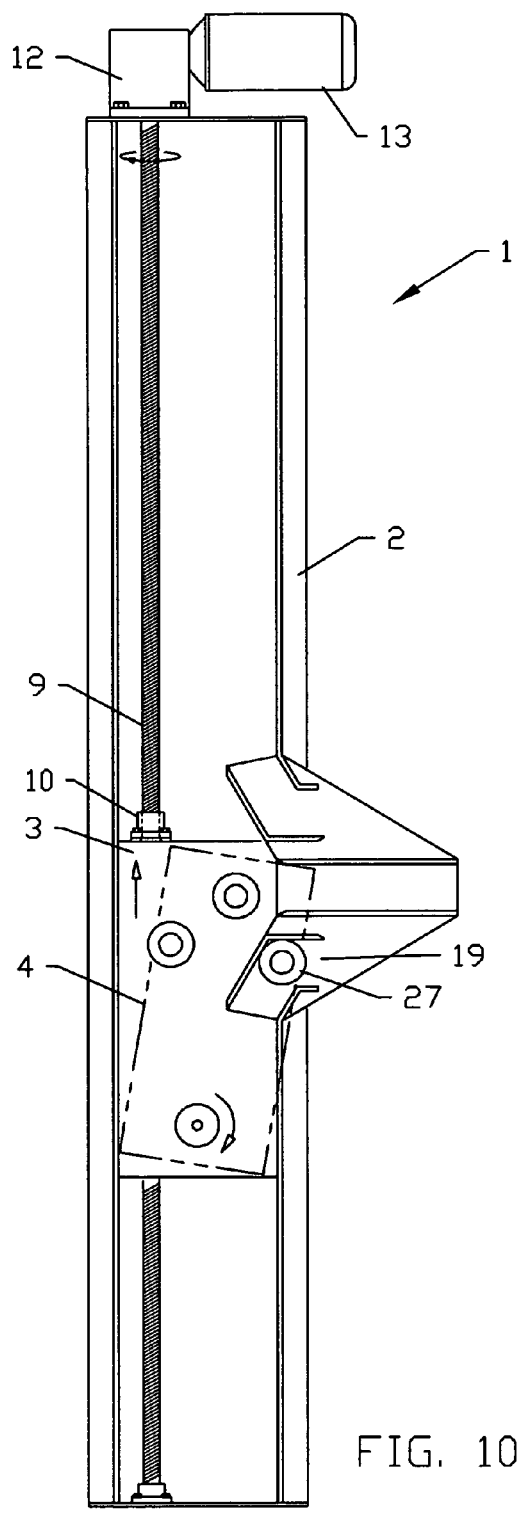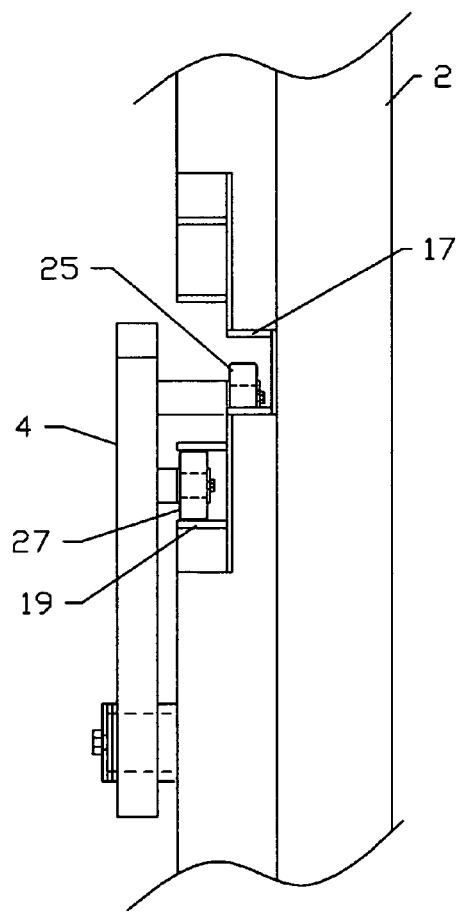
FIG. 10
FIG. 11

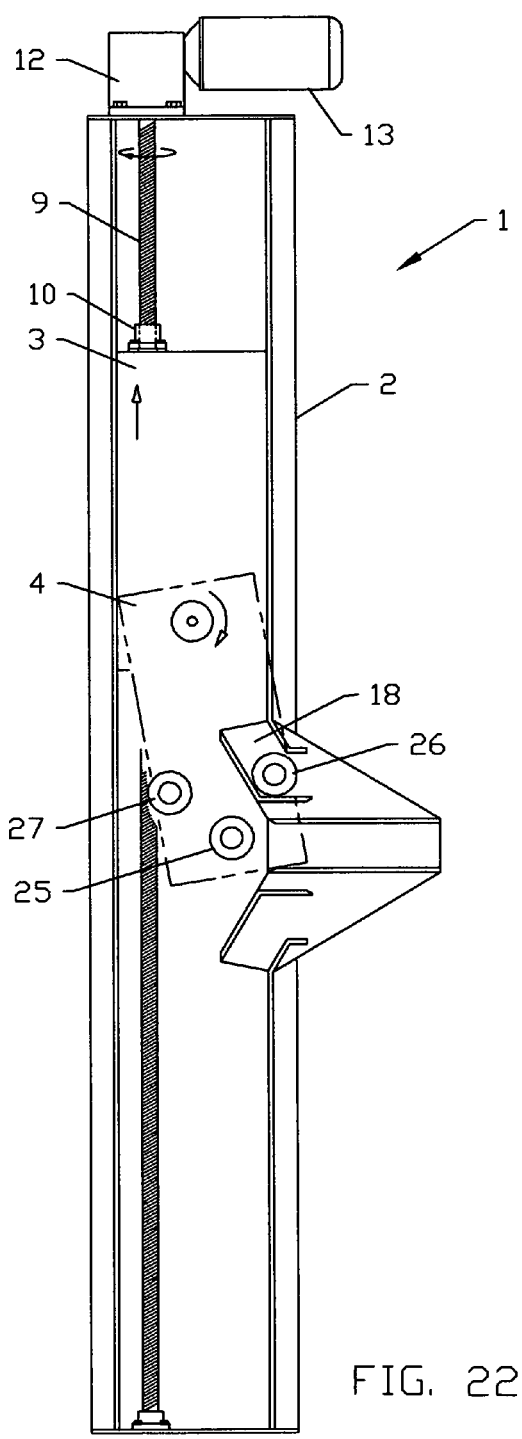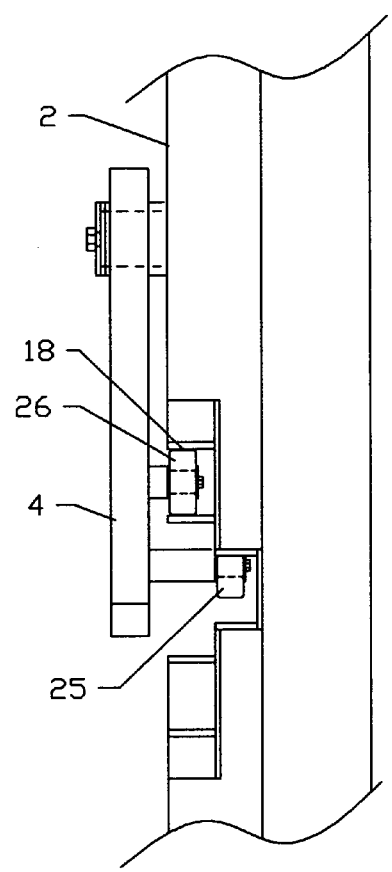
FIG. 22
FIG. 23

180 DEGREE INVERTING MECHANISM

BACKGROUND OF THE INVENTION

Many products used in manufacturing are transported in containers or drums. The product must be removed from the container during the manufacturing process. The most common method of removing the product from the container is by inverting the container, allowing gravity to cause the product to flow from the container. Some products, such as liquids or free-flowing solids, easily flow from the container and therefore do not require being fully inverted to empty the container. Other products, such as powders, do not flow freely and require the container to be fully inverted 180 degrees to completely empty the container.

A common existing mechanism used to invert containers employs a single cam roller and cam track to cause the container to invert as the container is raised. This mechanism is not capable of fully inverting the container 180 degrees due to limitations of the single cam roller. Therefore, this mechanism can only be employed for free-flowing products that do not require the container to be fully inverted 180 degrees.

Fully inverting a container 180 degrees is commonly achieved with the use of a hydraulic rotary actuator. The hydraulic rotary actuator is a rack and pinion type device that also provides motion control as the container's center of gravity goes past the axis of rotation, referred to as "overcentering". The hydraulic rotary actuator requires the use of hydraulic fluid for motion control as hydraulic fluid is non-compressible.

The use of hydraulic systems often presents a quality control issue due to the potential for product contamination with hydraulic fluid, as in the food and pharmaceutical industries. Yet there are many applications, particularly in the pharmaceutical industry, where it is necessary for the containers to be fully inverted 180 degrees in order to completely empty the container.

BRIEF SUMMARY OF THE INVENTION

It is thus a principal object of the present invention to provide an inverting mechanism capable of fully inverting a container or object 180 degrees.

Another object of this invention is to provide an inverting mechanism that provides motion control of the container or object during the inverting process.

A still further object of this invention is to provide an inverting mechanism that does not require the use of hydraulic actuators or hydraulic systems.

These and other objects will become apparent hereinafter.

BRIEF DESCRIPTION OF THE DRAWINGS

FIG. 1 is a front elevation view of the inverting mechanism.
FIG. 2 is a side elevation view of FIG. 1.
FIG. 8 is a front elevation view of the inverting mechanism at the beginning of operation.
FIG. 9 is a front elevation view of the inverting mechanism during the inverting process.
FIG. 10 is a front elevation view of the inverting mechanism during the inverting process.
FIG. 11 is an enlarged side elevation view of the cam track assembly of FIG. 10.
FIG. 22 is a front elevation view of the inverting mechanism during the inverting process.
FIG. 23 is an enlarged side elevation view of the cam track assembly of FIG. 22.

DETAILED DESCRIPTION OF THE INVENTION

Figure 3:
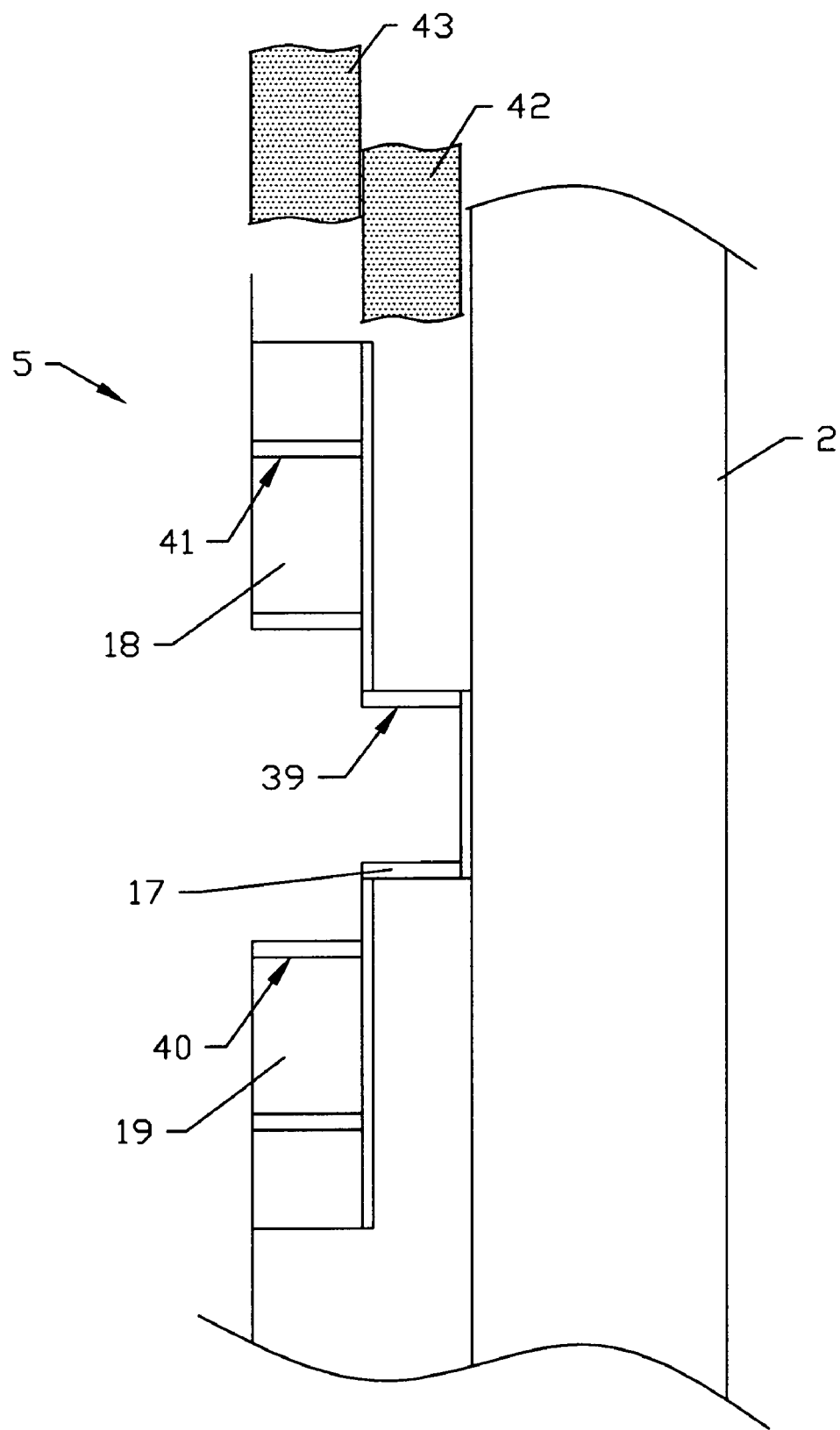
FIG. 3 is an enlarged side elevation view of the cam track assembly.

Referring to FIG. 1 thru FIG. 7, a 180 degree inverting mechanism 1 is provided. The inverting mechanism 1 is comprised of five main components which are the stationary frame 2, the carriage 3, the rotating member 4, the cam track assembly 5, and a drive 6.

As seen in FIG. 1, the stationary frame 2 provides the primary support structure for the inverting mechanism 1. The stationary frame 2 is adapted with a base plate 7 affixed to one end and a top plate 8 affixed to the opposite end. The drive 6 is comprised of a ball screw 9, a ball nut 10, an end bearing 11, a gear unit 12, and an electric motor 13. The electric motor 13 is connected to the gear unit 12 which is mounted to the top plate 8 with bolts 14. The gear unit 12 is connected to one end of the ball screw 9. The other end of the ball screw 9 is supported by the end bearing 11 which is secured to the base plate 7 with fasteners 15. The ball screw 9 passes thru the ball nut 10 which is secured to the carriage 3 with fasteners 16. As the ball screw 9 turns, the ball nut 10 travels up or down depending on the direction of rotation of the ball screw 9. The drive 6 is commonly known as a ball screw actuator. Alternative drives may be substituted including a variety of linear actuators, chain and sprocket drives, etc.; as would be obvious to anyone skilled in the art.

The cam track assembly 5 is affixed at an intermediate location along the length of the stationary frame 2. The cam track assembly 5 provides a first cam track 17, a second cam track 18, and a third cam track 19, as seen in FIG. 2 and FIG. 3. The first cam track 17 is located in a different plane 42 than the plane 43 in which the second cam track 18 and the third cam track 19 are located. The plane 42, 43 is defined as that space which is the width of, and in a direction perpendicular to, the contact surface 39, 40, 41 of the cam track 17, 18, 19; a portion of which is illustrated in FIG. 3.

Figure 4:
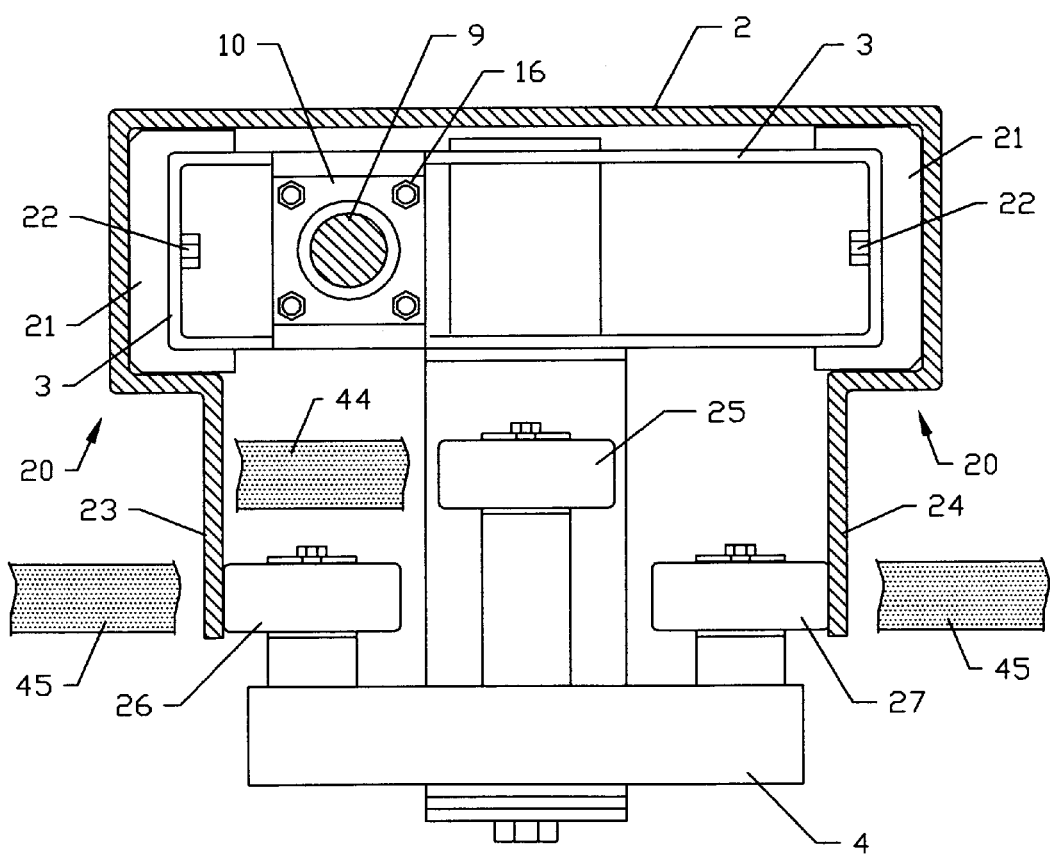
FIG. 4 is a horizontal section view of FIG. 1 taken along section line 4-4.

As seen in FIG. 4, the stationary frame 2 provides two guide tracks 20 sized to receive the guide blocks 21 which are secured to the carriage 3 with fasteners 22. The guide tracks 20 and the guide blocks 21 guide the carriage 3 in a linear direction relative to the stationary frame 2. The guide blocks 21 are constructed of plastic or other suitable material to reduce friction, and may be substituted with rollers as would be obvious to anyone skilled in the art.

The rotating member 4 represents the object to be inverted and is pivotally affixed to the carriage 3. The rotating member 4 is adapted with a first cam roller 25, a second cam roller 26, and a third cam roller 27. The first cam roller 25 is located in a different plane 44 than the plane 45 in which the second cam roller 26 and the third cam roller 27 are located. The plane 44, 45 is defined as that space which is the width of the cam roller 25, 26, 27 and in a direction perpendicular to the axis of the cam roller 25, 26, 27; a portion of which is illustrated in FIG. 4. The stationary frame 2 provides a left cam roller guide 23 and a right cam roller guide 24. The cam roller guides 23, 24 interface with the second cam roller 26 and third cam roller 27 to maintain the rotating member 4 in the proper orientation relative to the stationary frame 2.

Figure 5:
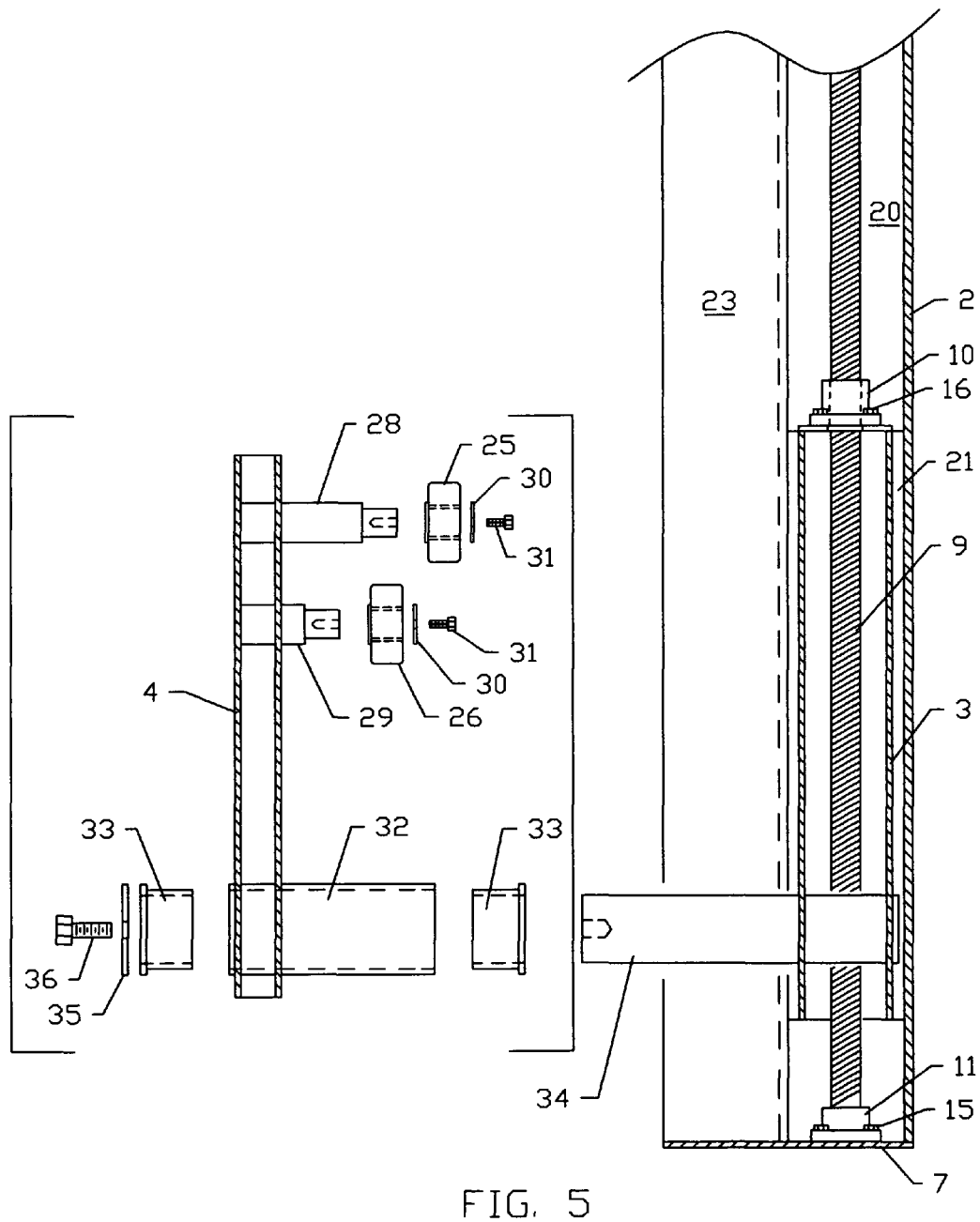
FIG. 5 is a vertical section view of FIG. 1 taken along section line 5-5 in exploded form.
Figure 6:
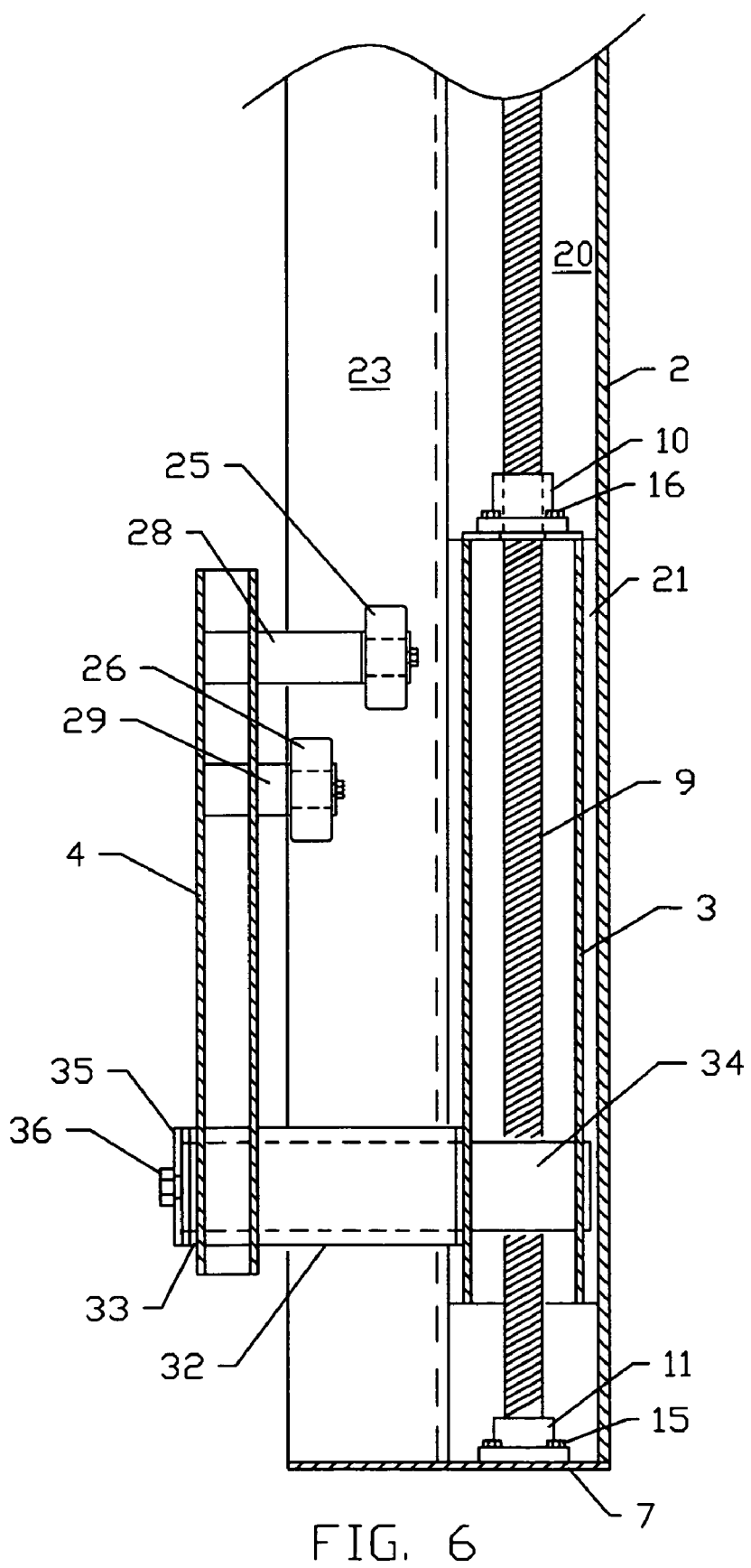
FIG. 6 is a vertical section view of FIG. 1 taken along section line 6-6.

As seen in FIG. 5 and FIG. 6, the rotating member 4 is adapted with a long cam roller mounting 28 for receiving and mounting the first cam roller 25 and a short cam roller mounting 29 for mounting the second cam roller 26. The cam rollers 25, 26 are retained on the cam roller mountings 28, 29 with a thrust washer 30 and fastener 31. The rotating member 4 is adapted with a pivot sleeve 32 sized to receive a bearing 33 at each end. The carriage 3 is adapted with a pivot bar 34 sized to receive the pivot sleeve 32 and bearings 33. The rotating member 4 is pivotally affixed on the pivot bar 34 with a thrust washer 35 and fastener 36.

Figure 7:
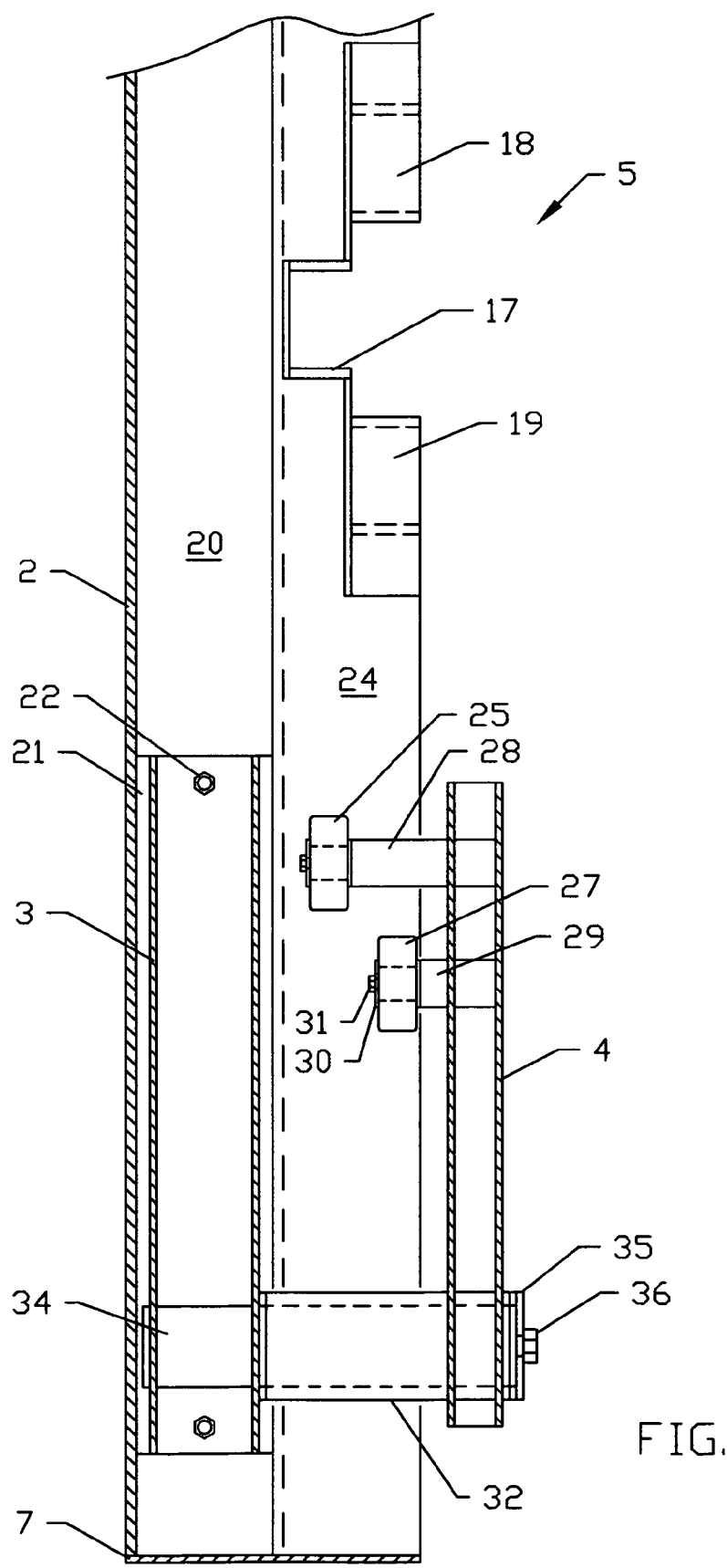
FIG. 7 is a vertical section view of FIG. 1 taken along section line 7-7.

As seen in FIG. 7, a short cam roller mounting 29 is also affixed to the rotating member 4 for mounting the third cam roller 27 which is retained on the short cam roller mounting 29 with a thrust washer 30 and fastener 31. The third cam track 19 is located in a plane to receive the third cam roller 27 and the first cam track 17 is located in a plane to receive the first cam roller 25; whereas the plane of the third cam roller 27 does not extend into the plane of the first cam track 17. It can be seen in FIG. 7 that the second cam track 18 is located in the same plane as the third cam track 19 and, as seen in FIG. 4, the second cam roller 26 is located in the same plane as the third cam roller 27; therefore, the second cam track 18 is located in a plane to receive the second cam roller 26 and the plane of the second cam roller 26 does not extend into the plane of the first cam track 17. The cam rollers 25, 26, 27 interface with the cam tracks 17, 18, 19 as the carriage 3 is moved in a linear direction relative to the stationary frame 2, causing the rotation of the rotating member 4. The cam tracks 17, 18, 19 are sized slightly larger than the cam rollers 25, 26, 27 to permit the rotation of the cam rollers 25, 26, 27.

Referring to FIG. 8 thru FIG. 25, the operation of the inverting mechanism 1 is illustrated. The various positions of the rotating member 4 are shown in phantom outline for clarity.

As seen in FIG. 8, the gear unit 12 and electric motor 13 rotate the ball screw 9, thereby driving the ball nut 10 upward. The ball nut 10, which is secured to the carriage 3, drives the carriage 3 upward in a linear direction relative to the stationary frame 2. The rotating member 4 is pivotally affixed to the carriage 3 and, therefore, also travels upward. As the carriage 3 and the rotating member 4 travel upward, the third cam roller 27 rides against the right cam roller guide 24 and the second cam roller 26 rides against the left cam roller guide 23; thereby maintaining the orientation of the rotating member 4 in an upright position relative to the stationary frame 2. As the carriage 3 and the rotating member 4 continues travel upward, the first cam roller 25 clears and passes the third cam track 19.

As seen in FIG. 9, the carriage 3 and the rotating member 4 continue travel upward and the third cam roller 27 engages the third cam track 19. This is the point that the rotating member 4 begins to rotate clockwise relative to the carriage 3.

As seen in FIG. 10 and FIG. 11, the carriage 3 continues travel upward and the third cam roller 27 travels up the third cam track 19, causing the rotating member 4 to rotate clockwise relative to the carriage 3.

Figure 12:
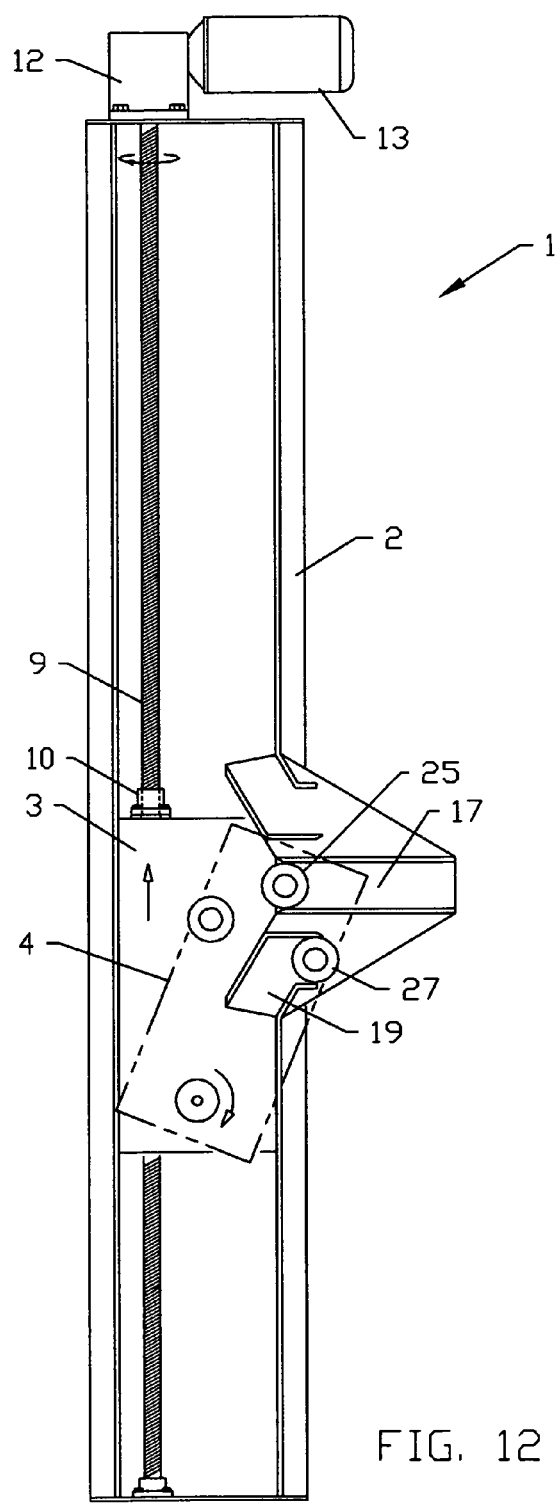
FIG. 12 is a front elevation view of the inverting mechanism during the inverting process.
Figure 13:
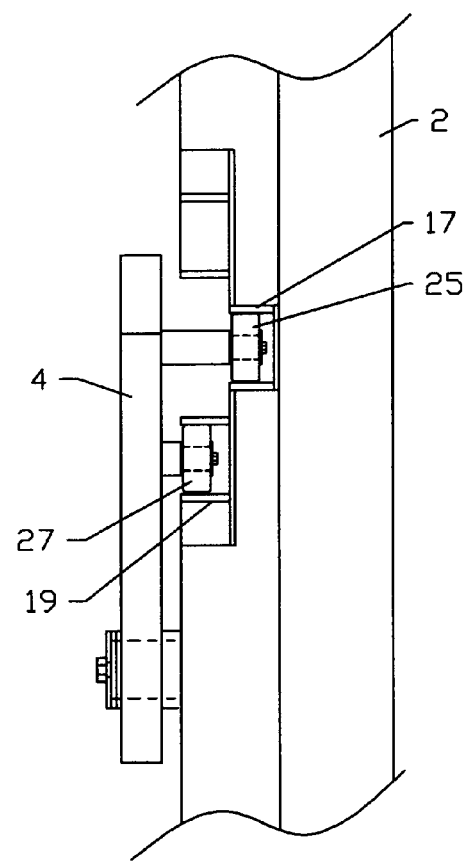
FIG. 13 is an enlarged side elevation view of the cam track assembly of FIG. 12.

As seen in FIG. 12 and FIG. 13, the carriage 3 continues travel upward and the third cam roller 27 continues travel in the third cam track 19, causing the rotating member 4 to further rotate clockwise relative to the carriage 3. Before the third cam roller 27 exits the third cam track 19, the first cam roller 25 enters the first cam track 17; thereby maintaining motion control of the rotating member 4.

Figure 14:
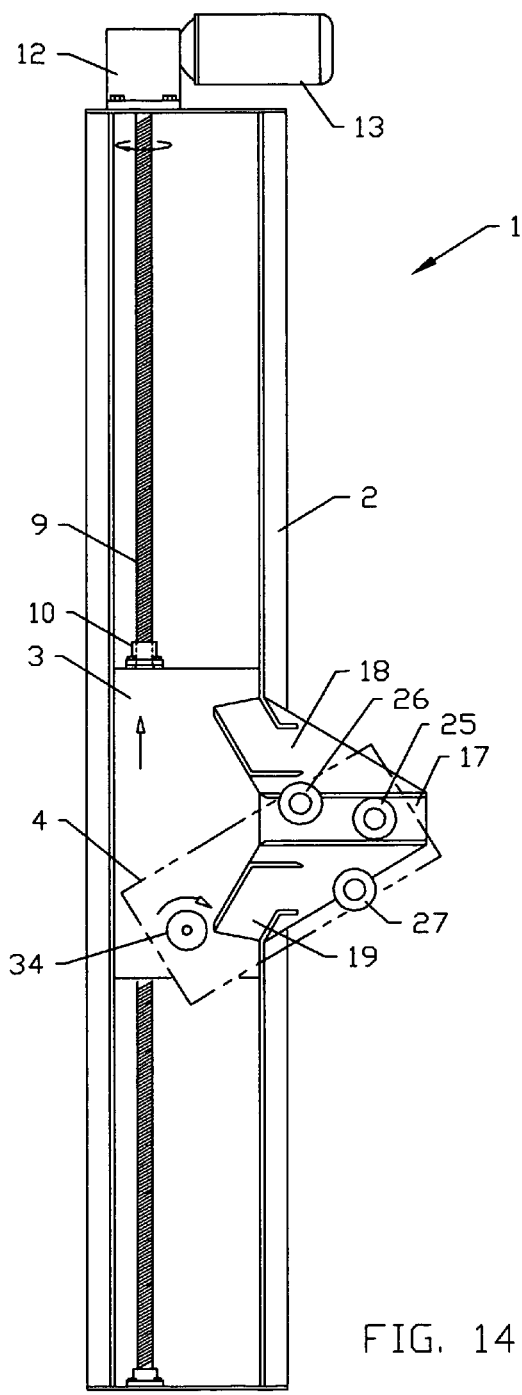
FIG. 14 is a front elevation view of the inverting mechanism during the inverting process.
Figure 15:
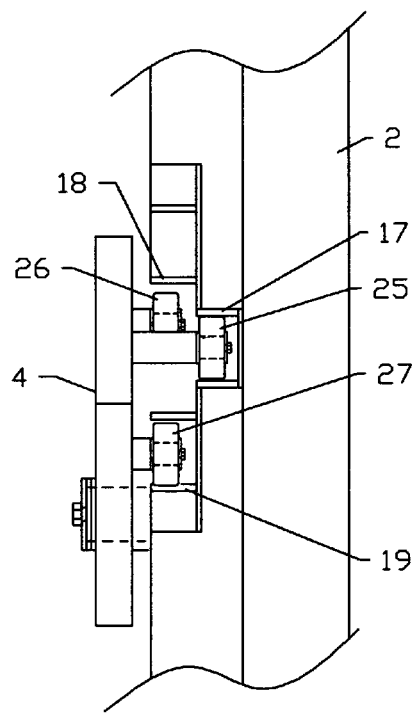
FIG. 15 is an enlarged side elevation view of the cam track assembly of FIG. 14.

As seen in FIG. 14 and FIG. 15, the carriage 3 continues travel upward and the first cam roller 25 continues travel in the first cam track 17, causing the rotating member 4 to further rotate clockwise relative to the carriage 3. The second cam roller 26 clears and passes the second cam track 18 and the first cam track 17. The pivot bar 34 also clears and passes the third cam track 19.

Figure 16:
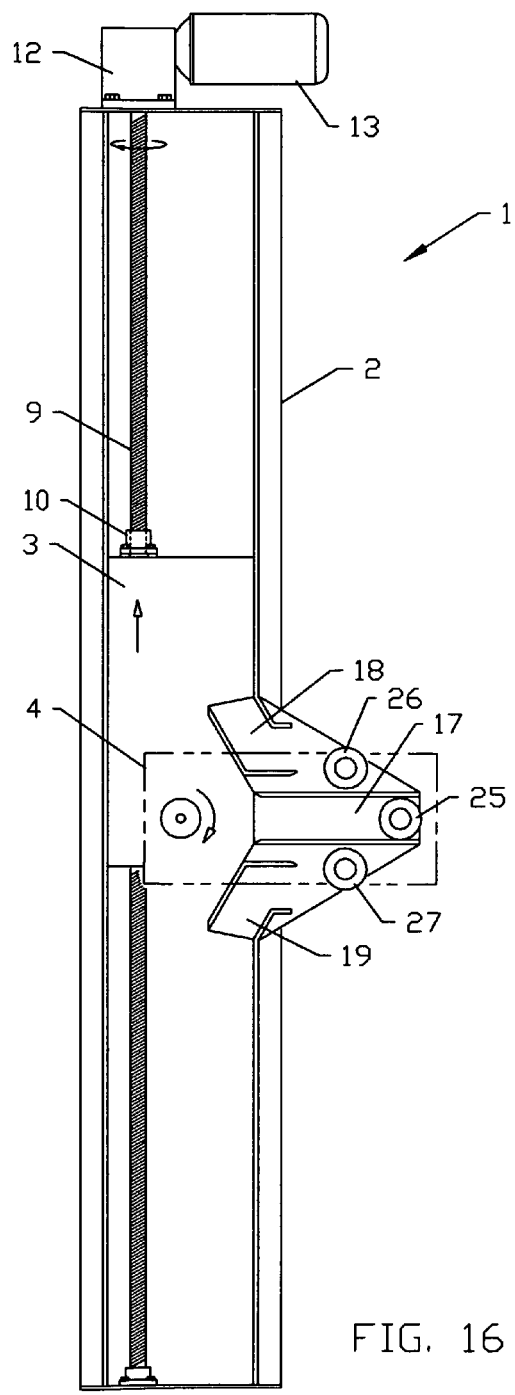
FIG. 16 is a front elevation view of the inverting mechanism during the inverting process.
Figure 17:
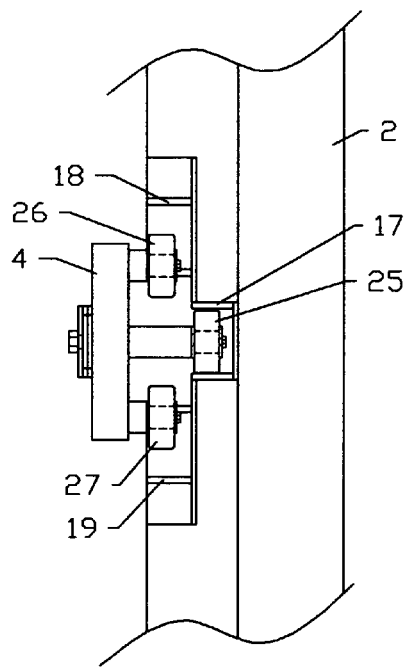
FIG. 17 is an enlarged side elevation view of the cam track assembly of FIG. 16.

As seen in FIG. 16 and FIG. 17, the carriage 3 continues travel upward and the first cam roller 25 continues travel in the first cam track 17, causing the rotating member 4 to further rotate clockwise relative to the carriage 3.

Figure 18:
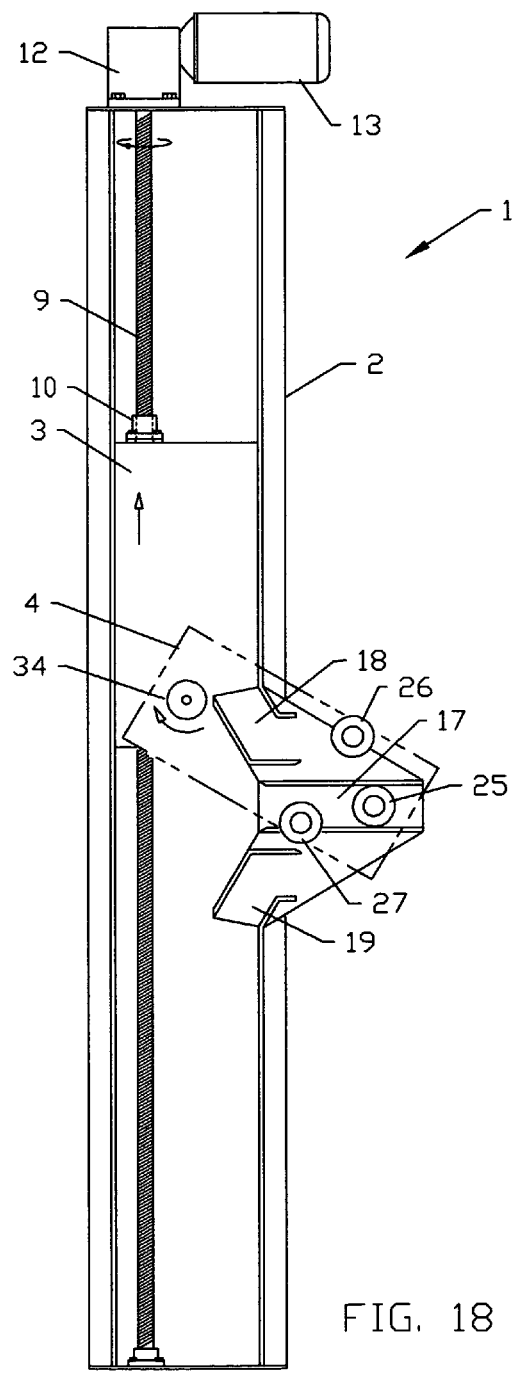
FIG. 18 is a front elevation view of the inverting mechanism during the inverting process.
Figure 19:
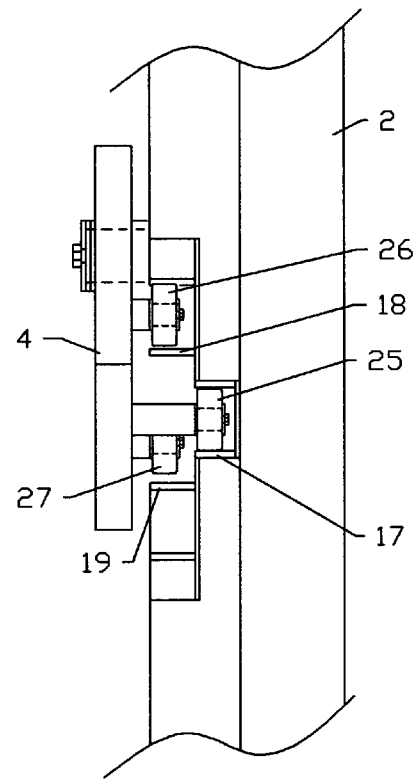
FIG. 19 is an enlarged side elevation view of the cam track assembly of FIG. 18.

As seen in FIG. 18 and FIG. 19, the carriage 3 continues travel upward and the first cam roller 25 reverses travel direction in the first cam track 17. This causes the rotating member 4 to further rotate clockwise relative to the carriage 3 due to the pivot bar 34 now being above the first cam track 17. The third cam roller 27 clears and passes the third cam track 19 and the first cam track 17. The pivot bar 34 also clears and passes the second cam track 18.

Figure 20:
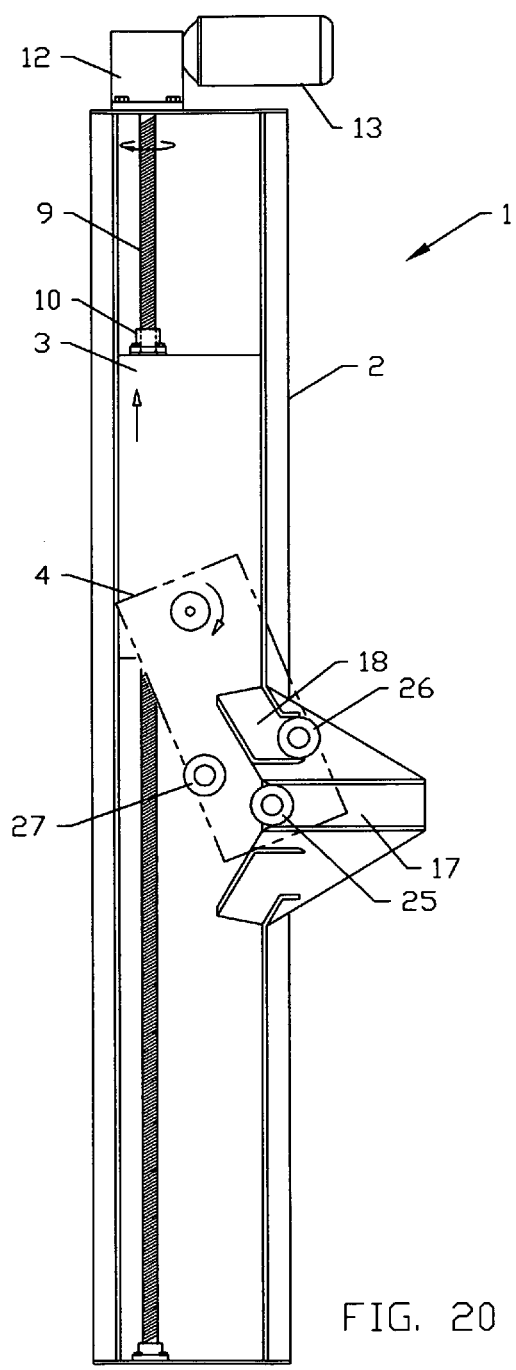
FIG. 20 is a front elevation view of the inverting mechanism during the inverting process.
Figure 21:
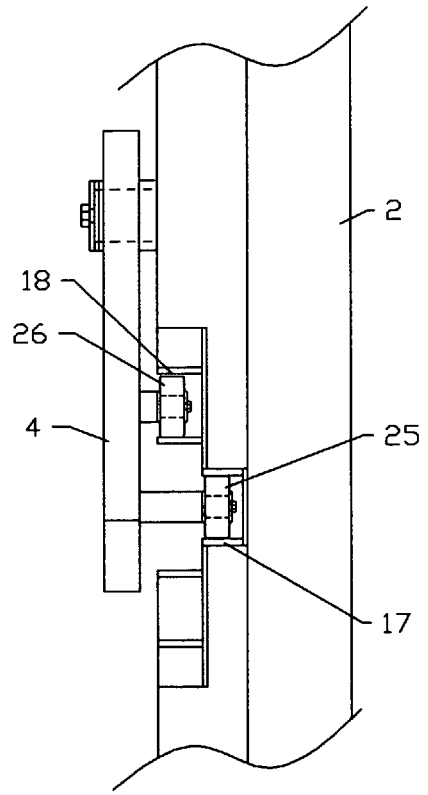
FIG. 21 is an enlarged side elevation view of the cam track assembly of FIG. 20.

As seen in FIG. 20 and FIG. 21, the carriage 3 continues travel upward and the first cam roller 25 continues the reverse travel direction in the first cam track 17. This causes the rotating member 4 to further rotate clockwise relative to the carriage 3. Before the first cam roller 25 exits the first cam track 17, the second cam roller 26 enters the second cam track 18; thereby maintaining motion control of the rotating member 4.

As seen in FIG. 22 and FIG. 23, the carriage 3 continues travel upward and the second cam roller 26 continues travel in the second cam track 18, causing the rotating member 4 to further rotate clockwise relative to the carriage 3.

Figure 24:
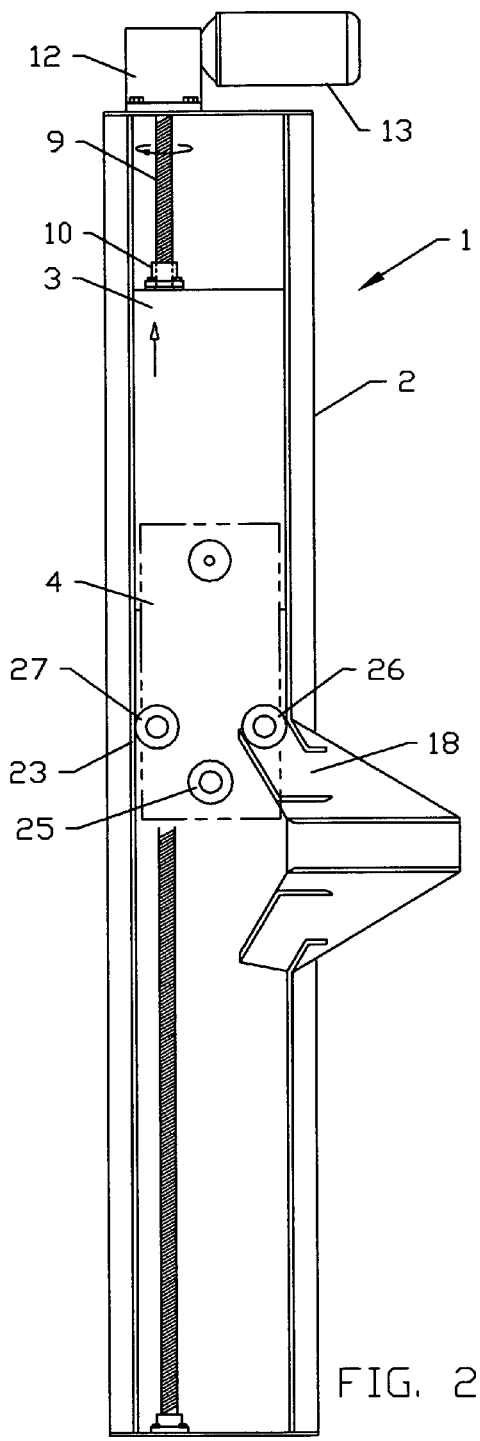
FIG. 24 is a front elevation view of the inverting mechanism in the inverted position.

As seen in FIG. 24, the carriage 3 continues travel upward and the second cam roller 26 travels up the second cam track 18, causing the rotating member 4 to further rotate clockwise to a fully inverted position relative to the stationary frame 2; having rotated a full 180 degrees from the original orientation. Before the second cam roller 26 exits the second cam track 18, the third cam roller 27 contacts against the left cam roller guide 23; thereby maintaining motion control of the rotating member 4.

Figure 25:
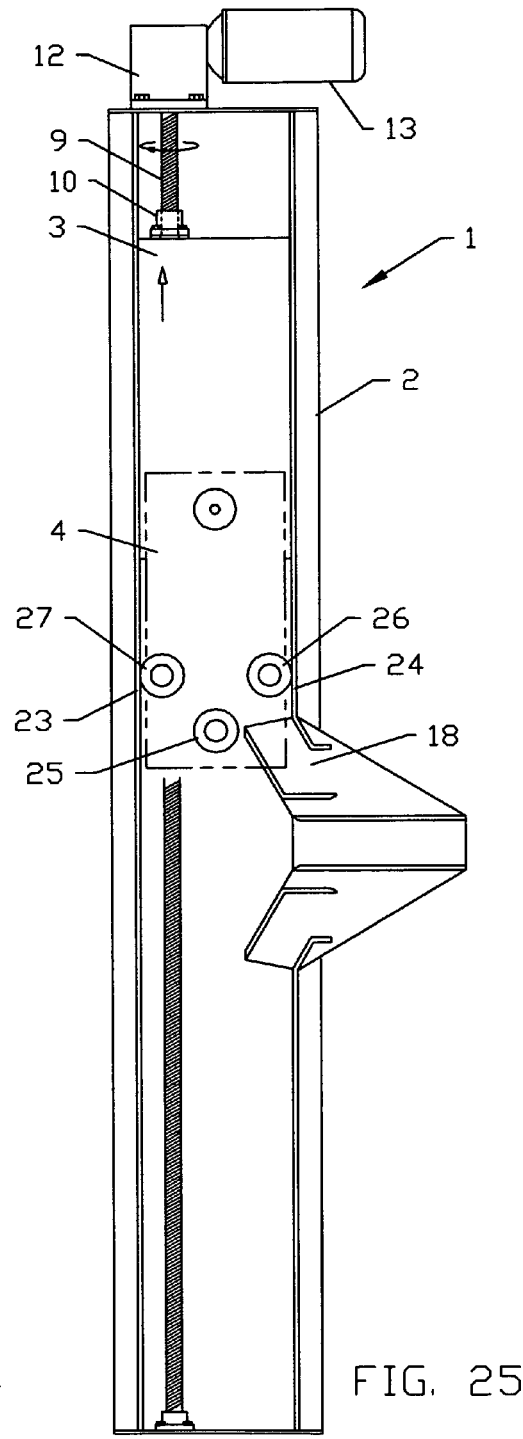
FIG. 25 is a front elevation view of the inverting mechanism in the inverted position.
Figure 26:
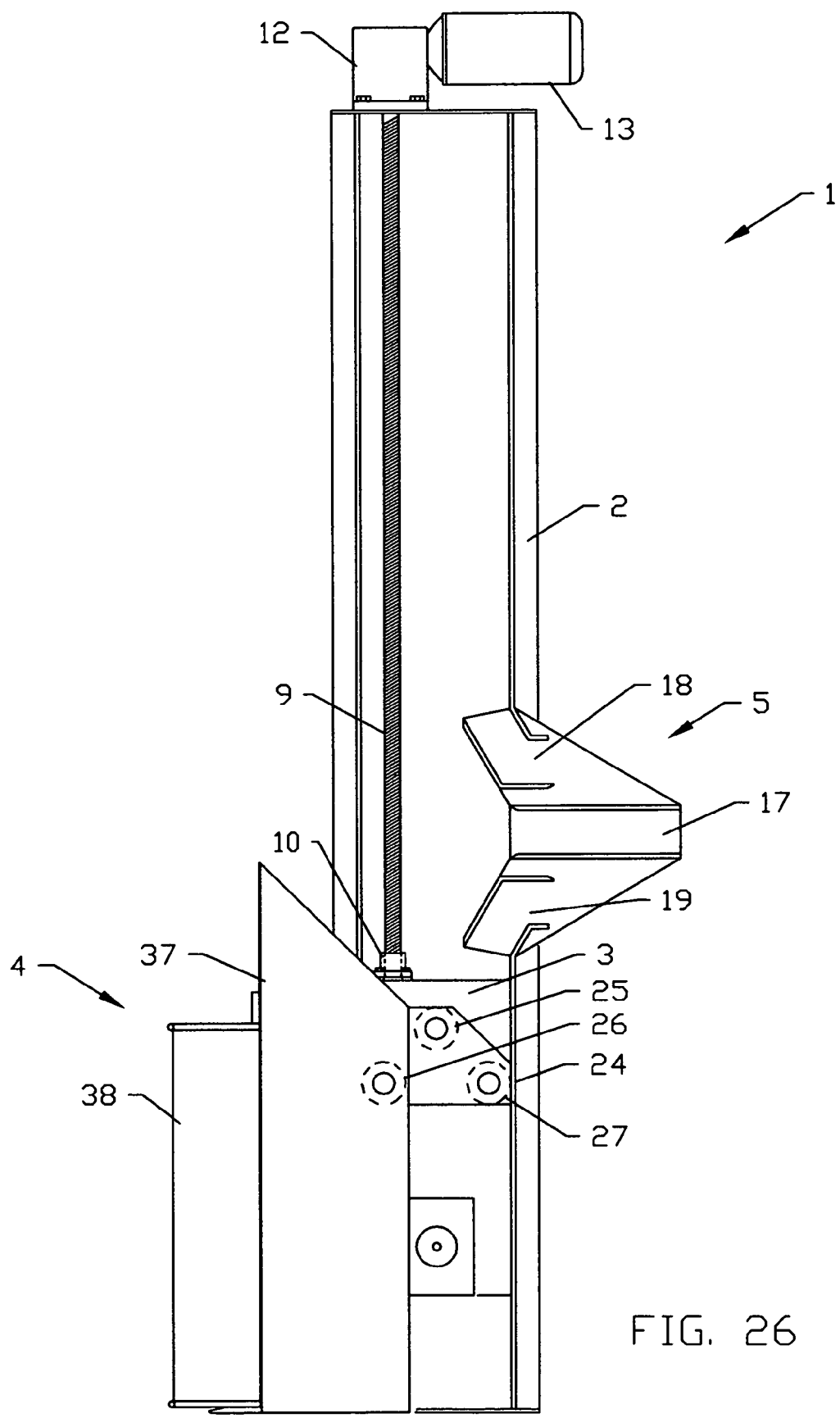
FIG. 26 is a front elevation view of the inverting mechanism with a receiver and container.
Figure 27:
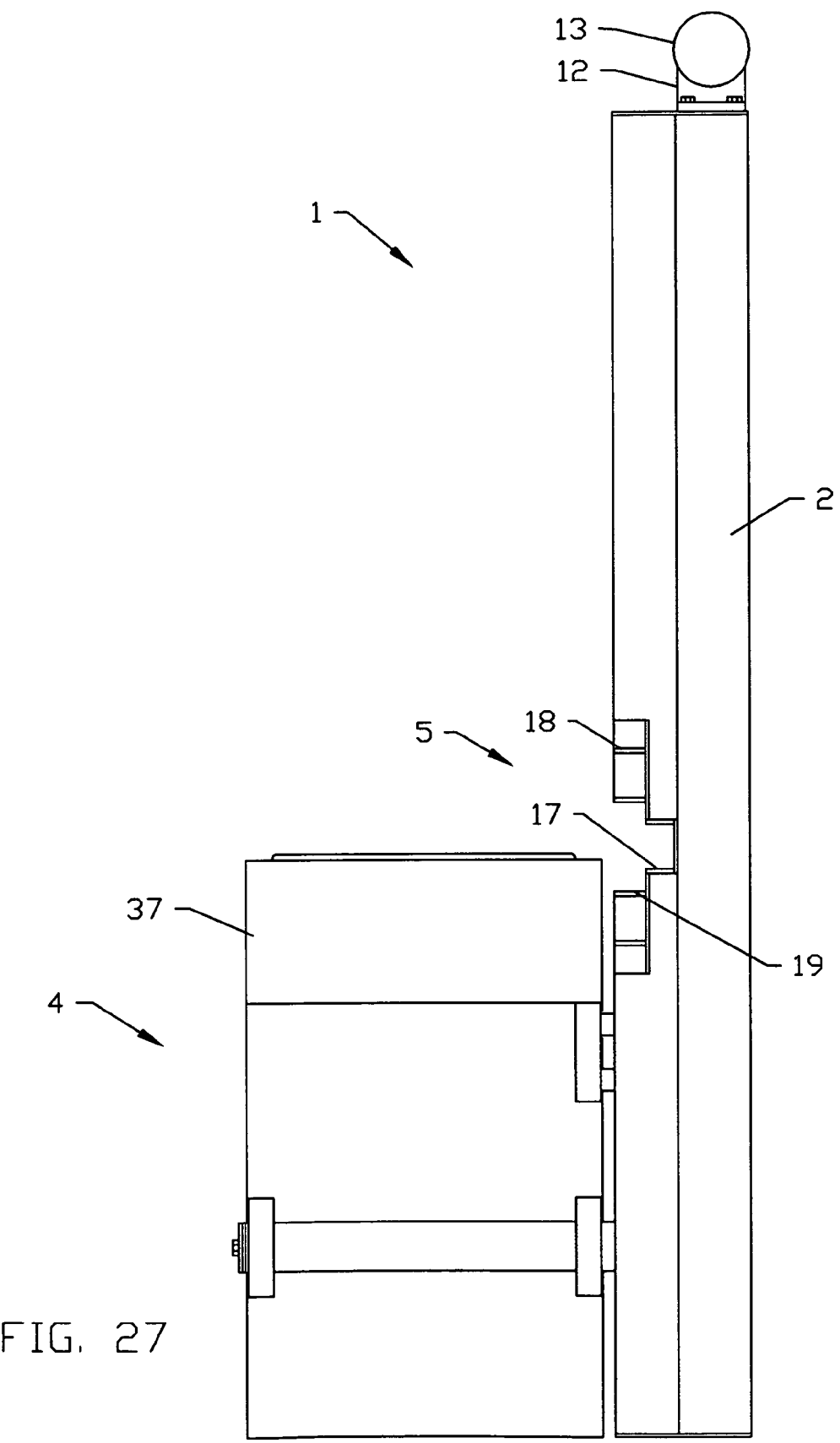
FIG. 27 is a side elevation view of FIG. 26.
Figure 28:
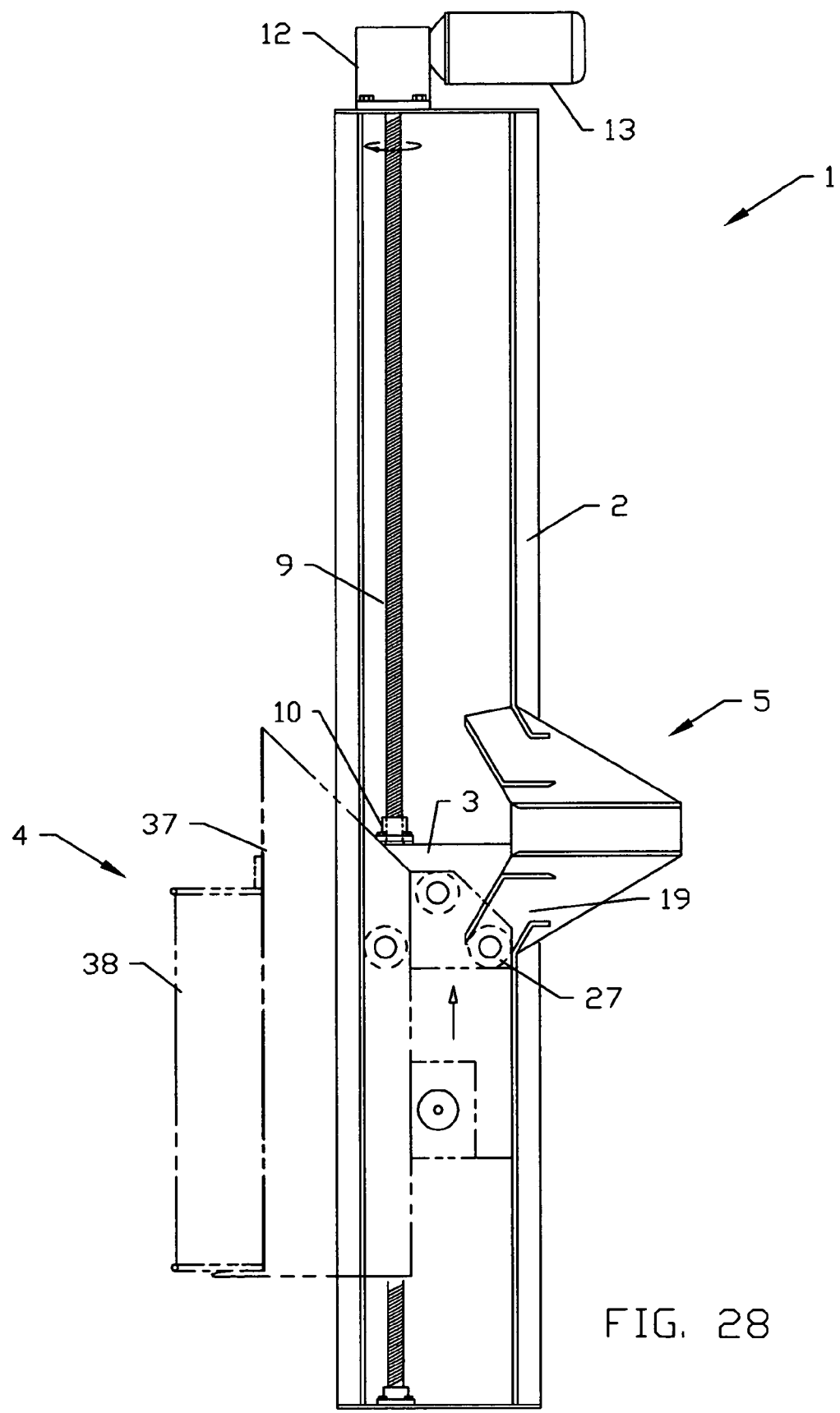
FIG. 28 is a front elevation view of the inverting mechanism with a receiver and a container as the rotating assembly at the beginning of the inverting process.
Figure 29:
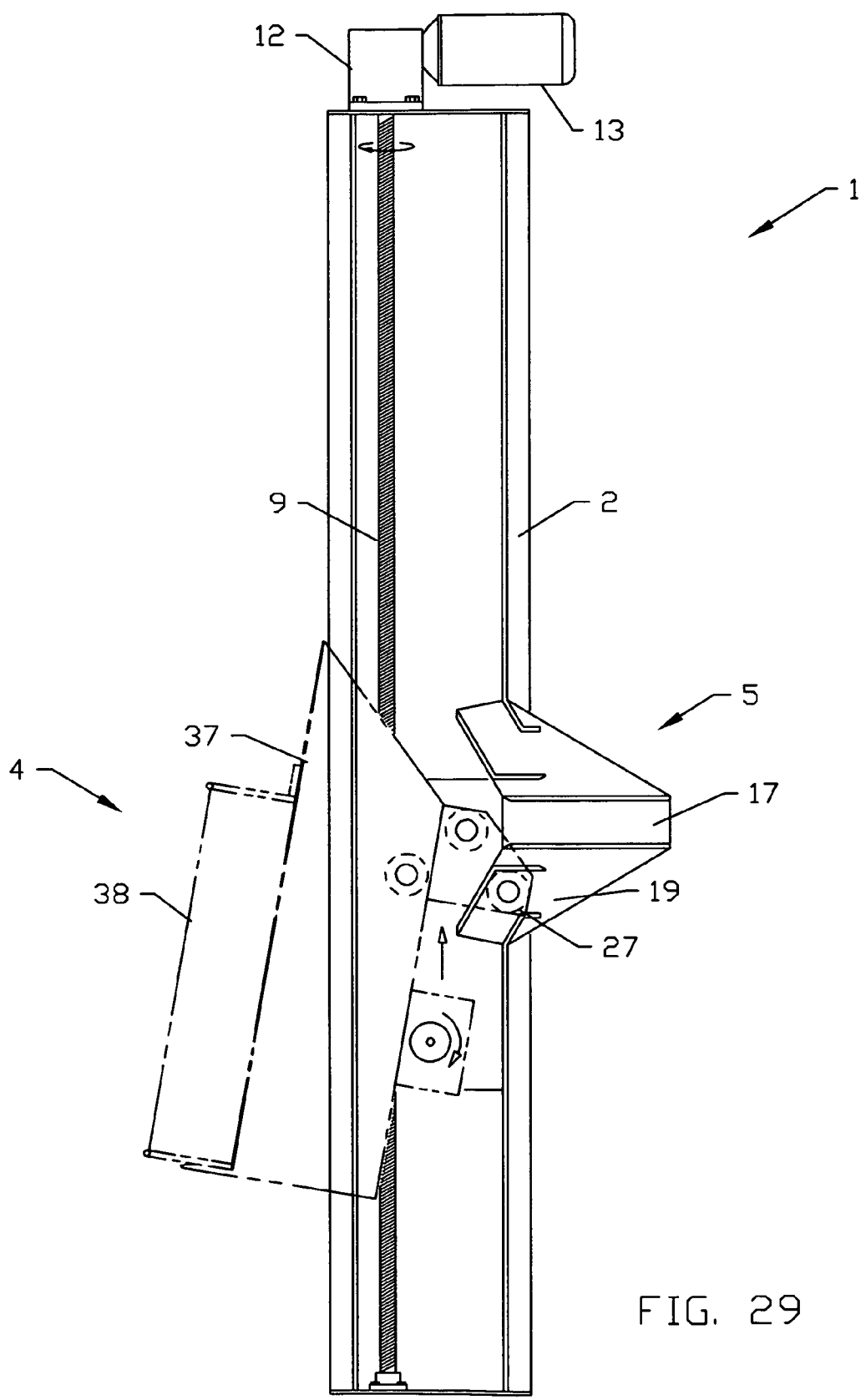
FIG. 29 is a front elevation view of the inverting mechanism during the inverting process.
Figure 30:
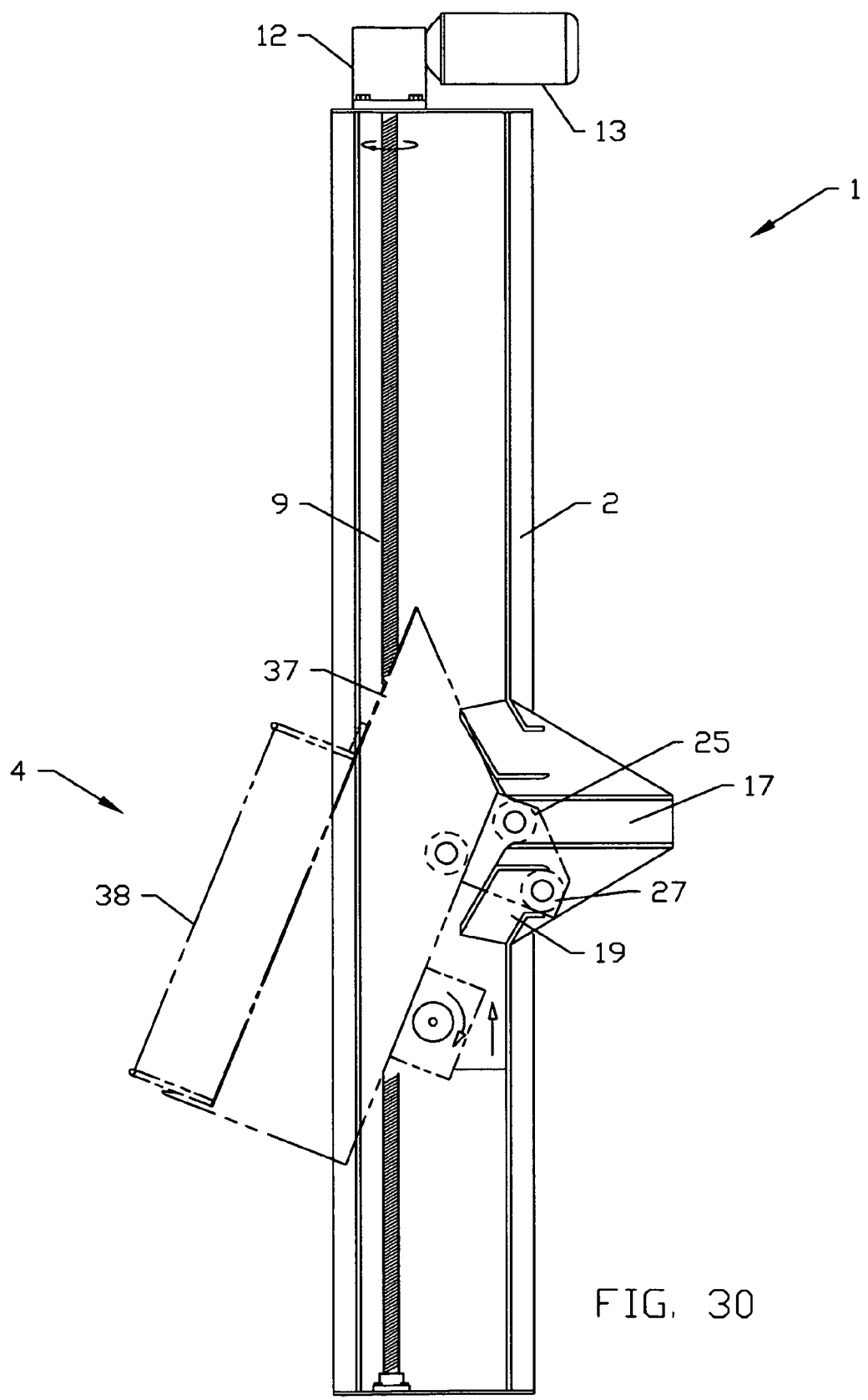
FIG. 30 is a front elevation view of the inverting mechanism during the inverting process.
Figure 31:
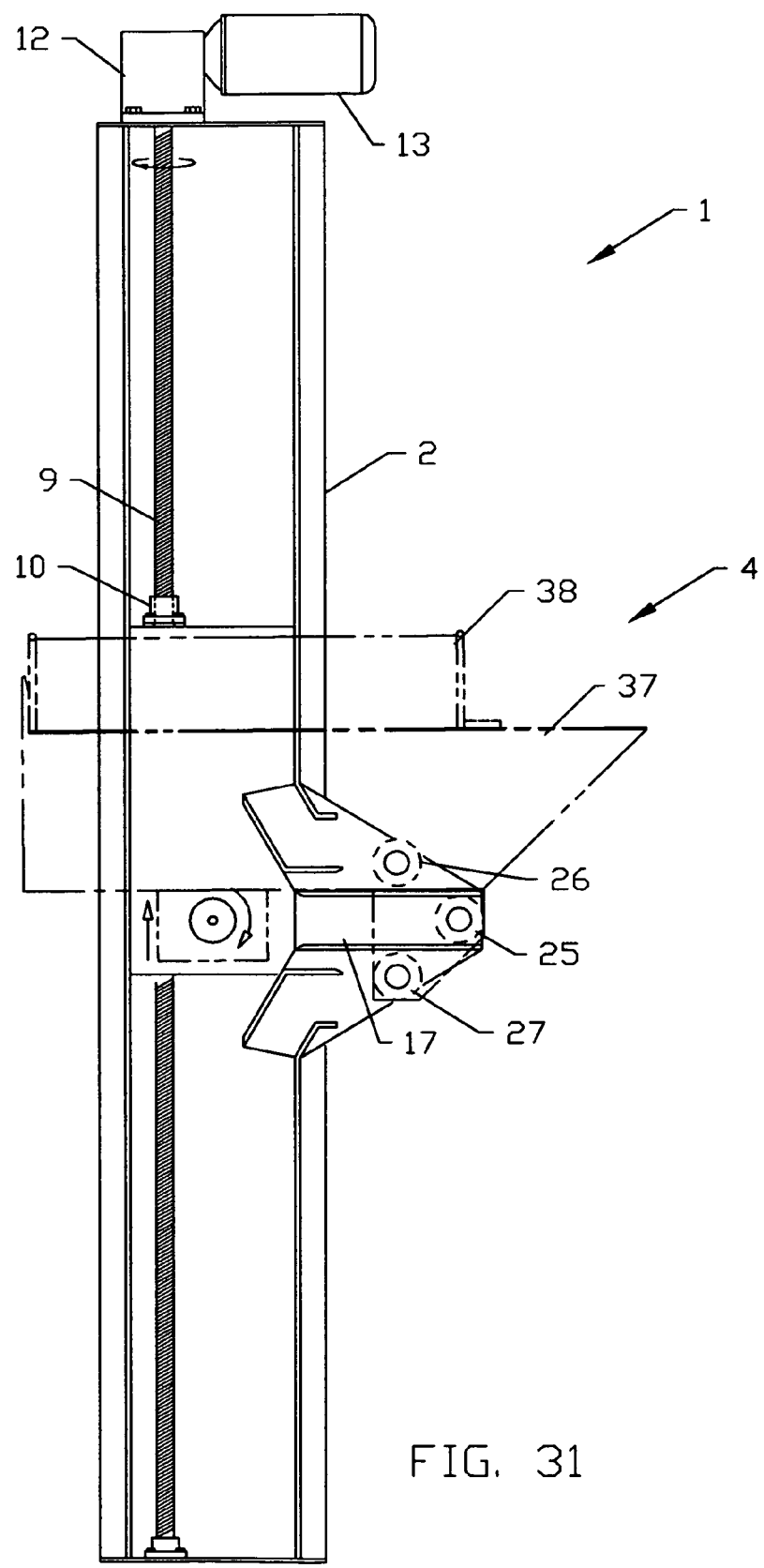
FIG. 31 is a front elevation view of the inverting mechanism during the inverting process.
Figure 32:
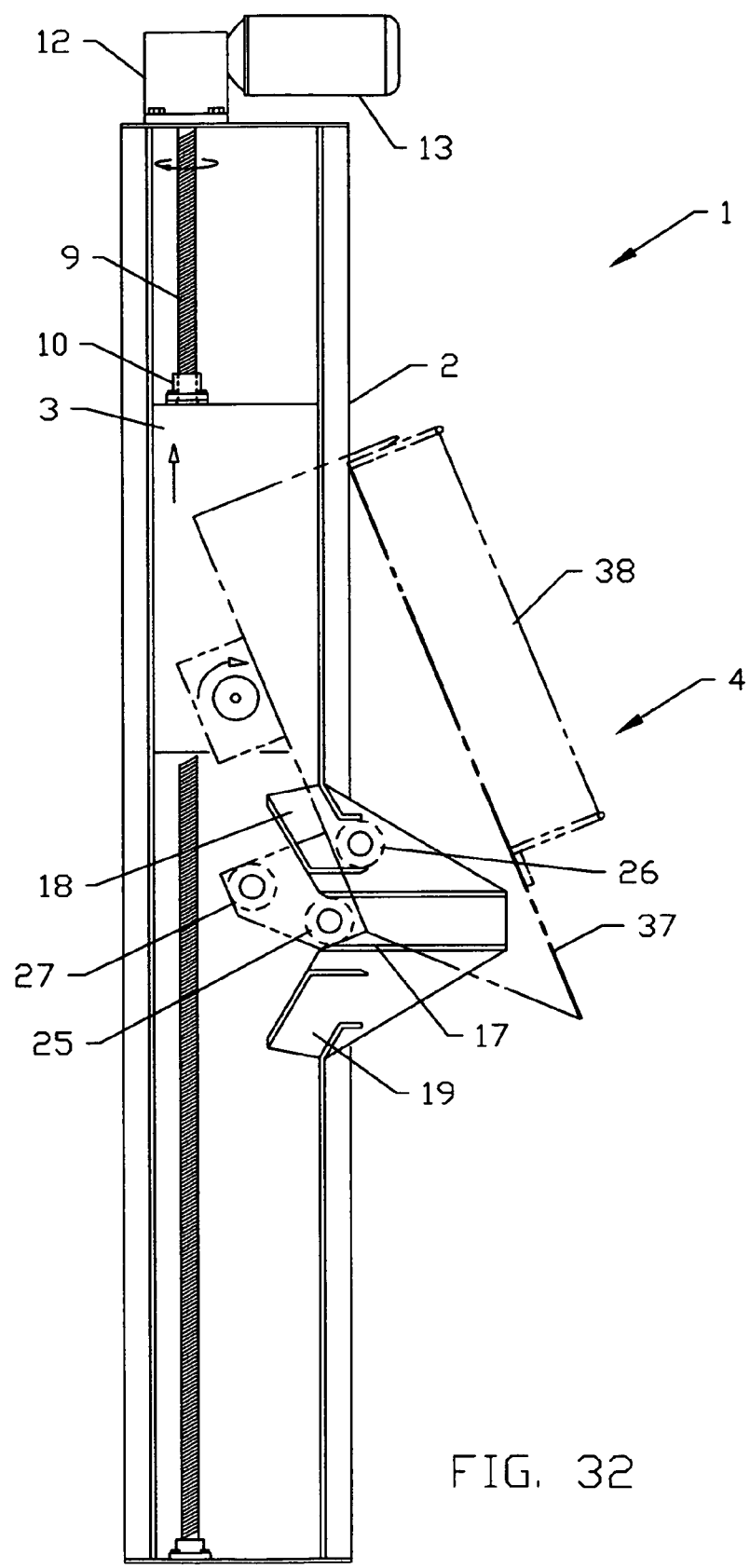
FIG. 32 is a front elevation view of the inverting mechanism during the inverting process.
Figure 33:
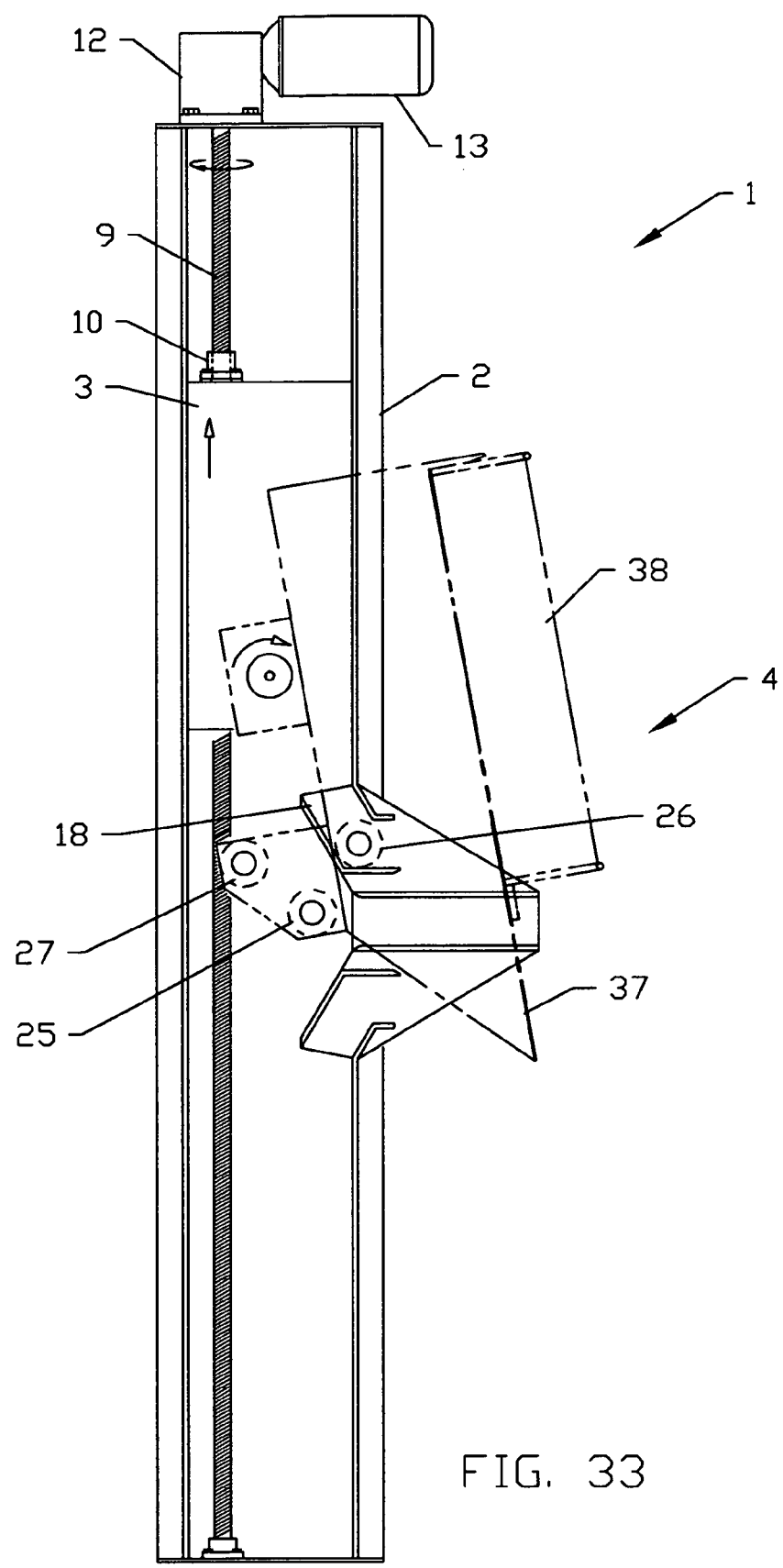
FIG. 33 is a front elevation view of the inverting mechanism during the inverting process.

As seen in FIG. 25, the carriage 3 may continue travel upward with the rotating member 4 in the inverted position. As the carriage 3 continues upward, the second cam roller 26 now rides against the right cam roller guide 24 and the third cam roller 27 now rides against the left cam roller guide 23; thereby maintaining the orientation of the rotating member 4 in an inverted position. As the rotating member 4 continues travel upward, the first cam roller 25 clears and passes the second cam track 18.

The carriage 3 and the rotating member 4 are returned to their original position by reversing the rotation direction of the electric motor 13, thereby reversing the rotation direction of the ball screw 9 and driving the ball nut 10 downward. The carriage 3 and the rotating member 4 simply follow the same motion demonstrated in FIG. 8 thru FIG. 25 in reverse order.

Figure 34:
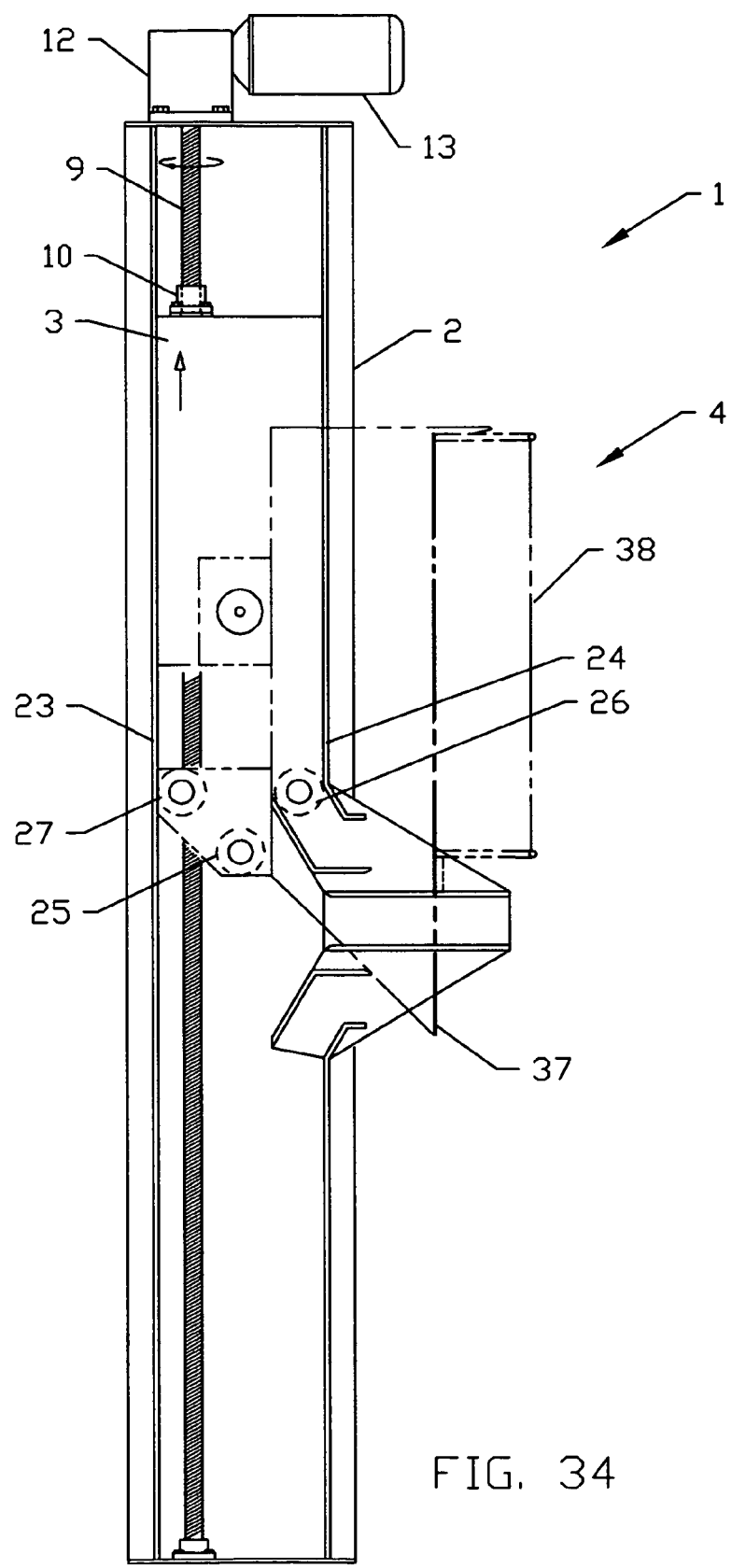
FIG. 34 is a front elevation view of the inverting mechanism with a receiver and a container as the rotating assembly in the inverted position.

Referring to FIG. 26 thru FIG. 34, the application of the inverting mechanism 1 for inverting containers is demonstrated. The rotating member 4 is comprised of a receiver 37 which is adapted to receive and secure a container 38. The operation of the inverting mechanism 1 for this application is illustrated in FIG. 28 thru FIG. 34. For clarity, the various positions of the receiver 37 and container 38 are shown in phantom outline. The operation of the inverting mechanism 1 for this application is the same as the operation presented in the discussion for FIG. 8 thru FIG. 25. The inverting mechanism 1 fully inverts the container 38 a full 180 degrees from the original orientation, as seen in FIG. 34, thereby allowing gravity to empty the contents.

The application of the inverting mechanism 1 is not limited to a vertical orientation and may be used in various applications to rotate other objects. The present invention may be provided in other modified forms and the foregoing description provides one embodiment of the invention for the purposes of this disclosure. It is intended to cover all modifications which do not depart from the spirit and scope of this invention.

What is claimed is:

1. An inverting mechanism for inverting an object, said inverting mechanism being comprised of:
   a) a stationary frame,
   b) a carriage adapted to move in a linear direction relative to said stationary frame,
   c) a rotating member pivotally affixed to said carriage, and
   d) a drive for moving said carriage in a linear direction;
   wherein the improvement comprises said rotating member being adapted with a plurality of cam rollers and said stationary frame being adapted with a plurality of cam tracks; at least one of said cam rollers being located in a different plane than the other said cam rollers and at least one of said cam tracks being located in a different plane than the other said cam tracks; more than one said cam rollers interfacing with said cam tracks as said carriage is moved in a substantially vertical and in a singular linear direction relative to said stationary frame, thereby causing the rotation of said rotating member.

2. The inverting mechanism of claim 1, wherein said plurality of cam rollers includes a first cam roller, a second cam roller, and a third cam roller; and said plurality of cam tracks includes a first cam track, a second cam track, and a third cam track;
   whereas said first cam roller is located in a different plane than said second cam roller and said third cam roller, and said first cam track is located in a different plane than said second cam track and said third cam track; said first cam roller interfacing with said first cam track, said second cam roller interfacing with said second cam track, and said third cam roller interfacing with said third cam track.

3. The inverting mechanism of claim 2 wherein said second cam roller and said third cam roller are located in the same plane.

4. The inverting mechanism of claim 1 wherein said rotating member is rotated 180 degrees.

5. The inverting mechanism of claim 1 wherein at least one of said cam rollers is positioned within one of said cam tracks throughout the rotation of said rotating member, thereby providing continuous motion control of said rotating member during rotation.

6. The inverting mechanism of claim 1 wherein said stationary frame is adapted with one or more cam roller guides; said cam roller guides interfacing with one or more of said cam rollers to maintain said rotating member in the proper orientation relative to said stationary frame as said rotating member travels in a linear direction before or after rotation.

7. The inverting mechanism of claim 1 wherein said drive is a ball screw actuator.

8. The inverting mechanism of claim 1 wherein said rotating member returns to the original position by reversing the linear direction of said carriage relative to said stationary frame.

9. The inverting mechanism of claim 1 wherein said rotating member is comprised of a receiver adapted to receive and secure a container; said inverting mechanism rotating said container to an inverted position, thereby allowing gravity to empty the contents of said container.

10. A cam mechanism for rotating an object, said cam mechanism being comprised of a cam track assembly, a carriage adapted to move in a linear direction relative to said cam track assembly, and a rotating member pivotally affixed to said carriage;
   wherein said rotating member is adapted with a plurality of cam rollers and said cam track assembly is adapted with a plurality of cam tracks; at least one of said cam rollers being located in a different plane than the other said cam rollers and at least one of said cam tracks being located in a different plane than the other said cam tracks; more than one said cam rollers interfacing with said cam tracks as said carriage is moved in a substantially vertical and in a singular linear direction relative to said cam track assembly, thereby causing the rotation of said rotating member.

11. The cam mechanism of claim 10 wherein said plurality of cam rollers includes a first cam roller, a second cam roller, and a third cam roller; and said plurality of cam tracks includes a first cam track, a second cam track, and a third cam track;
   whereas said first cam roller is located in a different plane than said second cam roller and said third cam roller; and said first cam track is located in a different plane than said second cam track and said third cam track; said first cam roller interfacing with said first cam track, said second cam roller interfacing with said second cam track, and said third cam roller interfacing with said third cam track.

12. The cam mechanism of claim 10 wherein said second cam roller and said third cam roller are located in the same plane.

13. The cam mechanism of claim 10 wherein said rotating member is rotated 180 degrees.

14. The cam mechanism of claim 10 wherein at least one of said cam rollers is positioned within one of said cam tracks throughout the rotation of said rotating member; thereby providing continuous motion control of said rotating member during rotation.

15. The cam mechanism of claim 10 wherein said rotating member returns to the original position by reversing the linear direction of said carriage relative to said cam track assembly.

16. An inverting mechanism for inverting a container, said inverting mechanism being comprised of:
  a) a stationary frame,
  b) a carriage adapted to move in a linear direction relative to said stationary frame,
  c) a rotating member pivotally affixed to said carriage, said rotating member being comprised of a receiver adapted to receive and secure said container, and
  d) a drive for moving said carriage in a linear direction;
  wherein the improvement comprises said rotating member being adapted with a plurality of cam rollers and said stationary frame being adapted with a plurality of cam contact surfaces; more than one said cam rollers interfacing with said cam contact surfaces as said carriage is moved in a substantially vertical and in a singular linear direction relative to said stationary frame, thereby causing the rotation of said rotating member and inverting said container.

17. The inverting mechanism of claim 16 where at least one of said cam rollers is located in a different plane other than the remaining said cam rollers.

18. The inverting mechanism of claim 16 wherein said plurality of cam rollers includes a first cam roller, a second can roller, and a third cam roller; and said plurality of cam contact surfaces includes a first cam contact surface, a second cam contact surface, and a third cam contact surface;
  whereas said first cam roller interfaces with said first cam contact surface, said second cam roller interfaces with said second cam contact surface, and said third cam roller interfaces with said third cam contact surface.

19. The inverting mechanism of claim 16 wherein said rotating member is rotated 180 degrees.

* * * * *